United States Patent
Bassi

(10) Patent No.: US 9,886,388 B2
(45) Date of Patent: Feb. 6, 2018

(54) DYNAMIC BLOCK-LEVEL INDEXING FOR CACHE WITH OVERFLOW

(71) Applicant: Citrix Systems, Inc., Fort Lauderdale, FL (US)

(72) Inventor: Ajai Kumar Bassi, Harrow (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 102 days.

(21) Appl. No.: 15/136,253

(22) Filed: Apr. 22, 2016

(65) Prior Publication Data

US 2017/0308473 A1    Oct. 26, 2017

(51) Int. Cl.
*G06F 12/08* (2016.01)
*G06F 12/0871* (2016.01)
*G06F 3/06* (2006.01)
*G06F 12/0817* (2016.01)

(52) U.S. Cl.
CPC ........ *G06F 12/0871* (2013.01); *G06F 3/0619* (2013.01); *G06F 3/0665* (2013.01); *G06F 3/0689* (2013.01); *G06F 12/0824* (2013.01); *G06F 2212/224* (2013.01); *G06F 2212/314* (2013.01)

(58) Field of Classification Search
CPC ............. G06F 12/0871; G06F 12/0824; G06F 3/0689; G06F 3/0619; G06F 3/0665; G06F 2212/224; G06F 2212/314
See application file for complete search history.

(56) References Cited

U.S. PATENT DOCUMENTS

| | | | |
|---|---|---|---|
| 2013/0166724 A1* | 6/2013 | Bairavasundaram . | G06F 9/5016 709/224 |
| 2013/0311690 A1* | 11/2013 | Ibrahim ............... | G06F 12/0804 710/74 |
| 2014/0281131 A1* | 9/2014 | Joshi .................... | G06F 12/0804 711/103 |
| 2016/0004611 A1* | 1/2016 | Lakshman .......... | G06F 11/2058 714/6.23 |

* cited by examiner

*Primary Examiner* — Hiep Nguyen
(74) *Attorney, Agent, or Firm* — Banner & Witcoff, Ltd.

(57) ABSTRACT

Methods, systems, computer-readable media, and apparatuses may provide management of virtual memory. For instance, aspects described herein relate to dynamic generation of nodes in a binary search tree in response to a write command, with each of its nodes being representative of different memory ranges in the virtual system disk. Each node may be associated with a different record in a global linked list, ordered by offset that includes pointers to locations where blocks are stored in a virtual cache and offsets of locations where blocks are stored in the virtual overflow disk. Aspects described herein relate to reading blocks from a virtual system memory to service a read command without storing the blocks in the virtual cache.

20 Claims, 9 Drawing Sheets

| Record ID | Node ID | Range/Byte Values | Block ID | Pointer to Location of Block in Virtual Cache | Offset Index to Location of Block in Virtual Overflow Disk | Block Size | Least Recently Used List |
|---|---|---|---|---|---|---|---|
| 1 | 1 | 30,000 – 32,000 | 1 | Pointer to Location 1 in Virtual Cache | Null | 2000 | Tx+2 |
| 2 | 2 | 25,000 – 26,000 | 2 | Pointer to Location 2 in Virtual Cache | Null | 1000 | Tx+1 |
| 3 | 3 | 32,001 – 34,000 | 3 | Null | Offset 1 | 1999 | Null |
| 4 | 4 | 500 – 1,500 | 4 | Null | Offset 2 | 1000 | Null |
| 5 | 5 | 26,500 – 27,500 | 5 | Pointer to Location 3 in Virtual Cache | Null | 500 | Tx+3 |
| 6 | 6 | 3,000 – 4,000 | 6 | Pointer to Location 4 in Virtual Cache | Null | 1000 | Tx |

| Freed Virtual Cache Overflow | Available Space |
|---|---|
| Offset 8 | 1000 |
| Offset 9 | 2000 |
| Offset 12 | 750 |

DYNAMIC BLOCK-LEVEL INDEXING FOR CACHE WITH OVERFLOW

FIELD

Aspects of the disclosure relate to computer hardware and software. In particular, one or more aspects of the disclosure generally relate to computer hardware and software for implementation of a dynamic, indexed block-level unique caching mechanism for virtual machines with an overflow disk.

BACKGROUND

During provisioning of a virtual machine, one or more virtual memories may be created for use with that virtual machine. These virtual memories may include a virtual cache, a virtual overflow disk, and/or a virtual system disk, each of which may correspond to physical memory resources (e.g., physical disk or memory) of the underlying one or more physical hosts hosting the virtual machine. In many instances, the time taken to provision the virtual machine (e.g., amount of time to start up a virtual machine) may be longer than desired. Much of the boot time of a virtual machine is a result of the virtual machine writing a table of contents (e.g., a map) that accounts for every sector of the various virtual memories to its virtual system disk. In doing so, the hypervisor propagates the write command of the table of contents to an image of the virtual disk reserved for this virtual machine. Since the sector is designed to be of a small size (as it is often the minimum size for a block of memory), there may be millions of sectors that must be accounted for when the virtual machine and hypervisor write the table of contents, which results in an increased lag at boot time of the virtual machine.

Exacerbating the problem, often hundreds or thousands of virtual machines may be booted up within a short time from one another. For example, at the beginning of a workday hundreds of people may request to create a virtual machine of their work computer or other device. Thus, the hypervisor and/or a session manager may have to map the virtual memories for each of the hundreds or thousands of virtual machines being requested within a short time frame from one another. This results in further increased lag time to boot up the virtual machines, which detracts from the overall user/customer experience.

In addition, for an upfront, fixed-size caching mechanism, a table of contents mapping virtual memory may use a large amount of memory space within the virtual memory of a virtual machine. In some cases, it may be at least 6 sectors in size, which is an unnecessarily large amount of space for the table of contents. Further, caching methodologies currently employed by virtual machines to satisfy read requests quickly fill the virtual cache. For instance, if a read block is retrieved from the virtual system disk, the read block is first written to the virtual cache prior to sending the read block to its requester. Once the virtual cache is filled, a virtual overflow disk is utilized by the virtual machine so that blocks in the virtual cache may overflow (e.g., move) from the virtual cache to the virtual overflow disk. As blocks are overflowed from the virtual cache to the virtual overflow disk, the table of contents mapping the virtual disk to the sectors/blocks must be constantly updated resulting in a vast amount of overhead as well as delay in servicing read and write commands, which detracts from the user/customer experience. Yet another issue caused by current virtual machine caching mechanisms is the need to periodically reboot the virtual machine once the overflow disk runs out of storage space.

BRIEF SUMMARY

Accordingly, there is an ever-present need to enhance the user experience by managing virtual memory so as to reduce boot time, increase available virtual memory, reduce the rate at which a virtual cache utilizes all of its available memory, and prevent the need for periodic reboot of the virtual machine.

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure address one or more issues described above by disclosing methods, computer-readable media, software systems, and apparatuses for providing dynamic indexing, at a block-level, of a virtual cache and a virtual overflow disk. The dynamic indexing may occur subsequent to the startup of the session and, thus, may reduce session boot up time. Particularly, rather than allocating a table of contents mapping the memory locations to blocks or sectors, a self-balancing search tree (e.g., a Georgy Adelson-Velsky and Evgenii Landis's (AVL) tree) may be dynamically generated for use in managing virtual memory as blocks are written to the virtual cache. More particularly, each node of the self-balancing search tree may be specific to a different block stored in a virtual cache or a virtual overflow disk. Further, each node may correspond to a record in a global linked list. As used herein, a record of the linked list may also be referred to as an entry of the global linked list or a linked list entry. If a block is stored in the virtual cache, the record may include a pointer to its location in the virtual cache. The self-balancing search tree may dynamically generate new nodes in response to receiving a write command if a requested memory range associated with the write command is unaccounted for by the tree.

The global linked list may include multiple linked list entries with each linked list entry corresponding to a different block resident in either the virtual cache or the virtual overflow disk. As an example, a single linked list entry may correspond with a single block resident in either the virtual cache or the virtual overflow disk. As discussed above, if the block is stored in the virtual cache, the linked list entry for that block may include a pointer to the block's location in the virtual cache. If a block is stored in virtual overflow disk, the linked list entry may include an offset to the location of the block in the virtual overflow disk. In some cases, the offset field of the multiple linked list entries may collectively be referred to as an offset index, which may be dynamically generated upon reaching a virtual cache overflow threshold and may be dynamically updated as blocks are moved to (or from) the virtual overflow disk. The virtual overflow threshold may be reached when there is insufficient space in the virtual cache to store a new write block. In such a case, a block may be moved from the virtual cache to the virtual overflow disk and the block may be assigned an offset to the location of the block in the virtual overflow disk. If the block is the first block moved from the virtual cache to the virtual overflow disk, then the block may be assigned a preset offset value (e.g., zero or some other value). As subsequent blocks are moved from the virtual cache to the virtual overflow disk, the offset value for each block may be incremented sequentially. As a result, a block moved to the virtual overflow disk is stored immediately adjacent to a block previously moved to the virtual overflow disk. By storing blocks in the virtual overflow disk immediately adjacent to one another rather at random locations (e.g., free spots) in the virtual overflow disk, the burden on an I/O mechanism (e.g., a driver) responsible for managing the blocks is reduced thereby enabling further optimization of write blocks.

In some cases, an input/output (IO) request issuer may send a write command to a driver of a virtual machine to write data to a virtual system disk. Each (e.g., all) write commands may include an offset and length, which may be used to determine a requested range. If a portion of the requested range is not overlapped by a range of any node of the self-balancing search tree, one or more new nodes may be added to the search tree and/or one or more existing nodes may be adjusted to account for the non-overlapping range portions of the requested range. In such an instance, the self-balancing search tree may be updated by adding new nodes or extending an existing node's assigned range. Each new node may be associated with a different new block written to the virtual cache. Further, new records corresponding to the new nodes may be added to the global linked list. Each new record may include a pointer to the new block's location in the virtual cache.

In some cases, the IO request issuer may send a read command to the driver to read data from the virtual system disk. The read command may include an offset relative to the virtual system disk and a length. The driver may determine a requested range that begins at the offset and ends at the summation of the offset and length. The driver may traverse the self-balancing search tree to identify nodes having a range that at least partially overlaps the requested range. In cases where there is a partial hit (e.g., a first portion of the requested range is overlapped by a range of one or more nodes of the search tree and a second portion of the requested range is not overlapped by any range of any node of the search tree), the first portion of the requested range may be read from the virtual cache and the second portion of the requested range may be read from the virtual system disk. The blocks read from the virtual cache and the virtual system disk may be placed in a virtual IO buffer. Blocks read from the virtual system disk might not be placed in the virtual cache to prevent unnecessary consumption of the virtual cache's resources. In addition, the driver may update a least recently used list based on the blocks read the virtual cache and the virtual system disk.

In some embodiments, an apparatus may include a processor and a non-transitory computer-readable medium storing one or more instructions that, when executed by the processor, causes the apparatus to perform a number of steps. The apparatus may generate a virtual session comprising a virtual driver, a virtual cache, a virtual overflow disk, and a virtual system disk. The virtual driver may receive, from an input/output request issuer, a write command including an offset and a length. The offset being relative to the virtual system disk. The virtual driver may calculate a requested range based on the offset and the length. In response to determining that an overflow condition for the virtual cache has been satisfied, the virtual driver may transfer one or more blocks from the virtual cache to the virtual overflow disk and determine whether any nodes of a tree have a range that at least partially overlaps the requested range. In response to determining that none of the nodes have a range that at least partially overlaps the requested range, the virtual driver may generate a new node for the tree having a range that at least overlaps a portion of the requested range.

In some embodiments, a system may include a computing device providing a virtual session for another computing device. The virtual session including a virtual cache, a virtual overflow disk, a virtual system disk, a tree, and a virtual driver. The tree may include multiple nodes with each node having a different range and being associated with a different record in a global linked list. Each record may include a pointer to a location of a block stored in the virtual cache or an offset to a location of a block stored in the virtual overflow disk. In response to receiving a write command, the virtual driver may determine whether at least one node of the tree has a range that at least partially overlaps a first requested range associated with the write command. In response to determining that none of the nodes of the tree have a range that at least partially overlaps the requested range, generate a node for the tree that has at least a portion of the first requested range, and a corresponding record in a global linked list. The record may include a pointer to a location of a block associated with the node in the virtual cache. In response to receiving a read command, the virtual driver may determine whether one or more nodes of the tree have a range that at least partially overlaps a second requested range associated with the read command.

In some embodiments, a computing device may perform a method. The computing device may generate a virtual session that includes a virtual driver, a virtual cache, a virtual overflow disk, and a virtual system disk. The virtual driver may receive, from an input/output request issuer, a write command that includes an offset and a length where the offset is relative to the virtual system disk. The virtual driver may calculate a first requested range based on the offset and the length. In response to determining that an overflow condition for the virtual cache has been satisfied, the virtual driver may transfer one or more blocks from the virtual cache to the virtual overflow disk and determine whether any nodes of a tree have a range that at least partially overlaps the first requested range. In response to determining that none of the nodes of the tree have a range that at least partially overlaps the first requested range, the virtual driver may generate a new node for the tree having a range that overlaps at least a portion of the first requested range.

These features, along with many others, are discussed in greater detail below.

BRIEF DESCRIPTION OF THE DRAWINGS

The present disclosure is illustrated by way of example and not limited in the accompanying drawings in which like reference numerals indicate similar elements and in which:

FIGS. 6A and 6B respectively depict a global linked list and a free list in accordance to one or more illustrative aspects herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
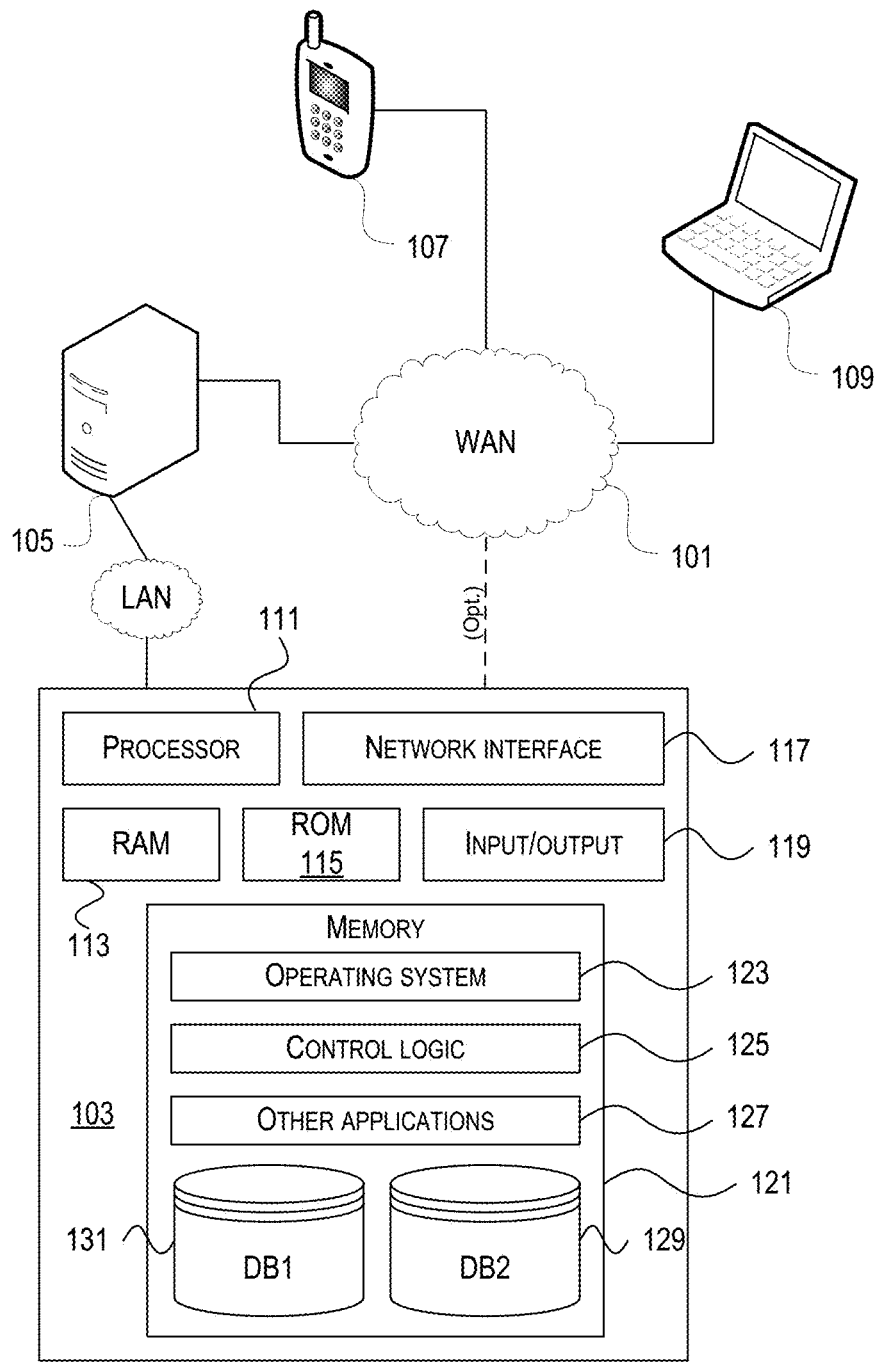
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 131 and a second database 129. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer-executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
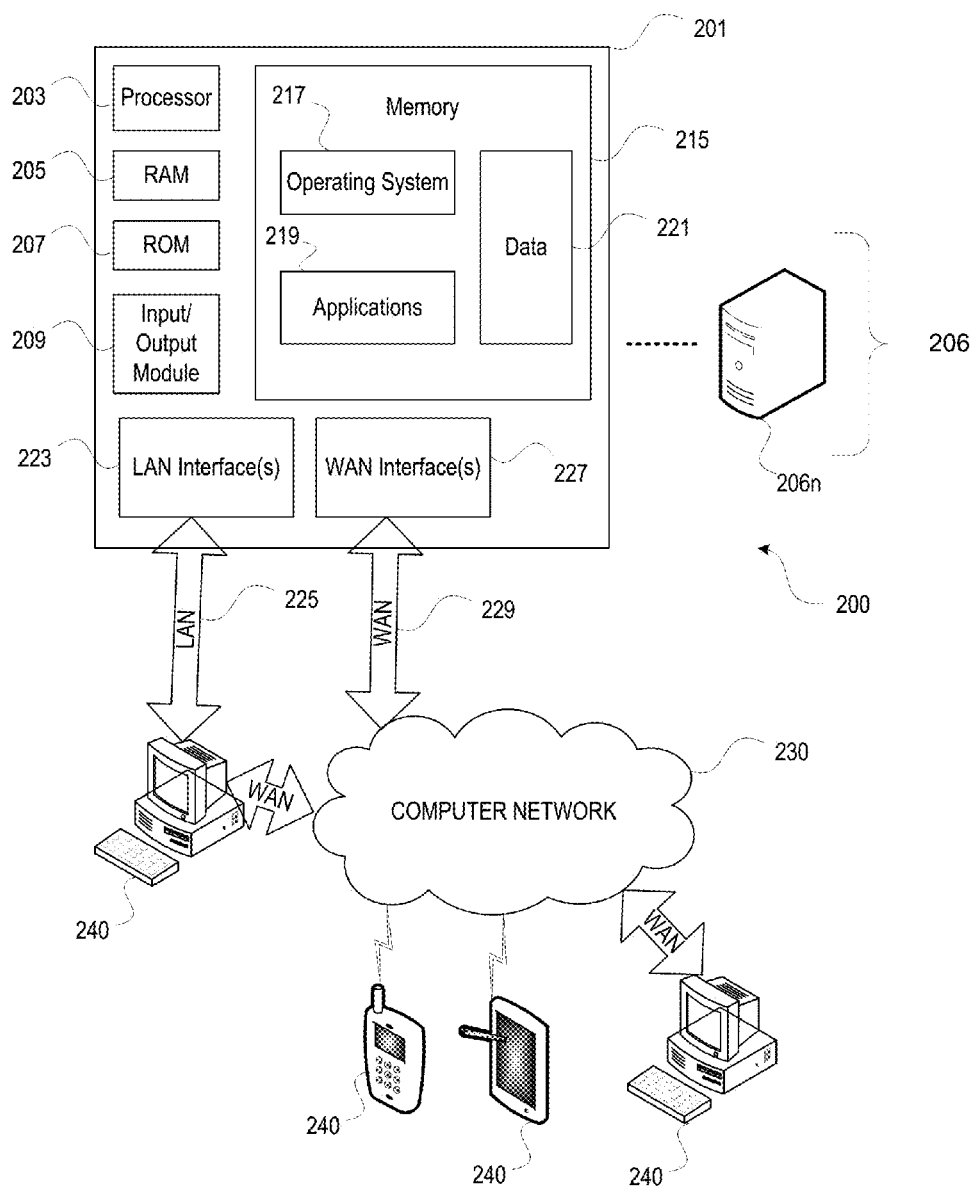
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
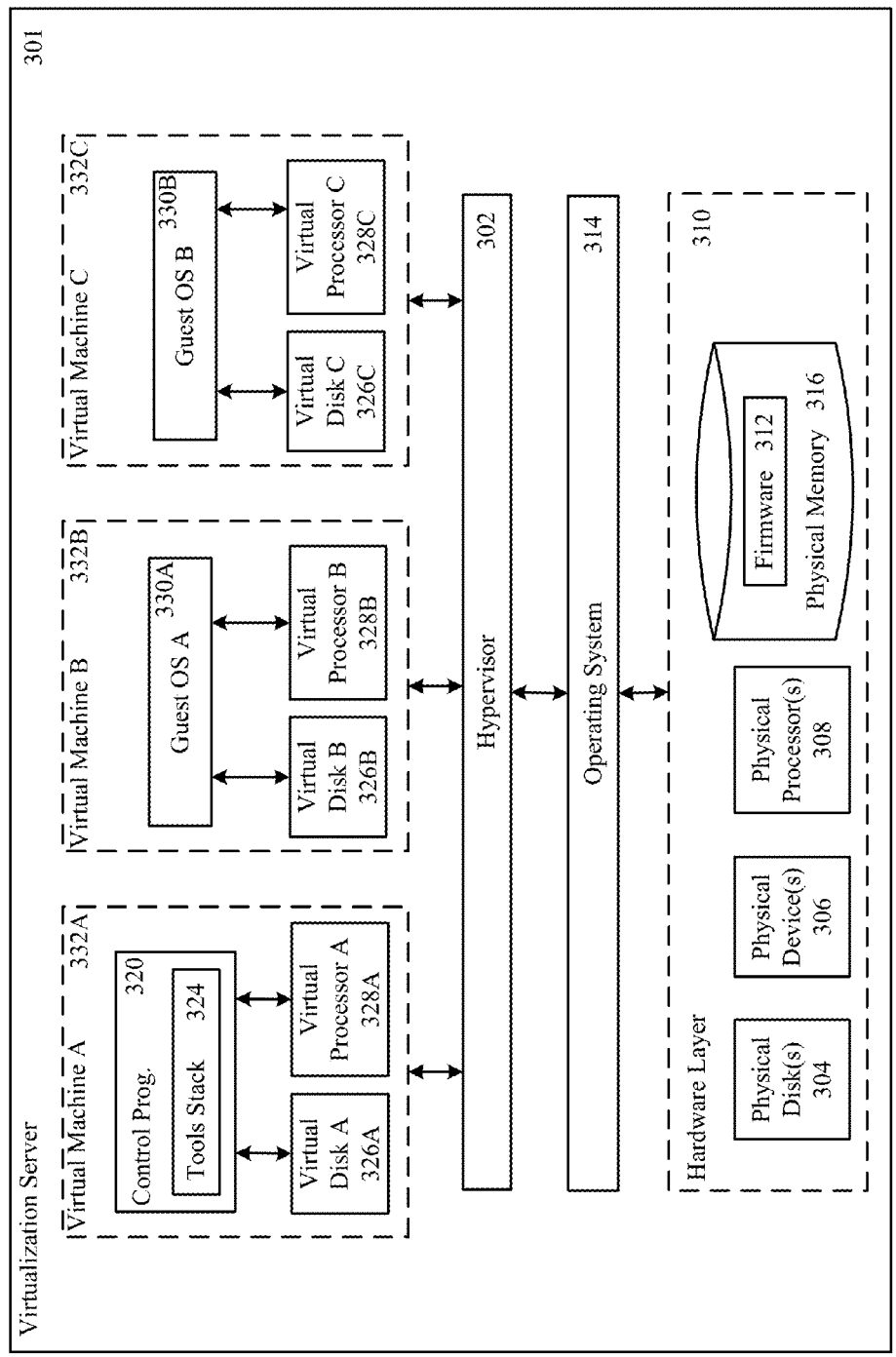
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer 310 that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, session 0 or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Cache Management Mechanisms

Figure 4:
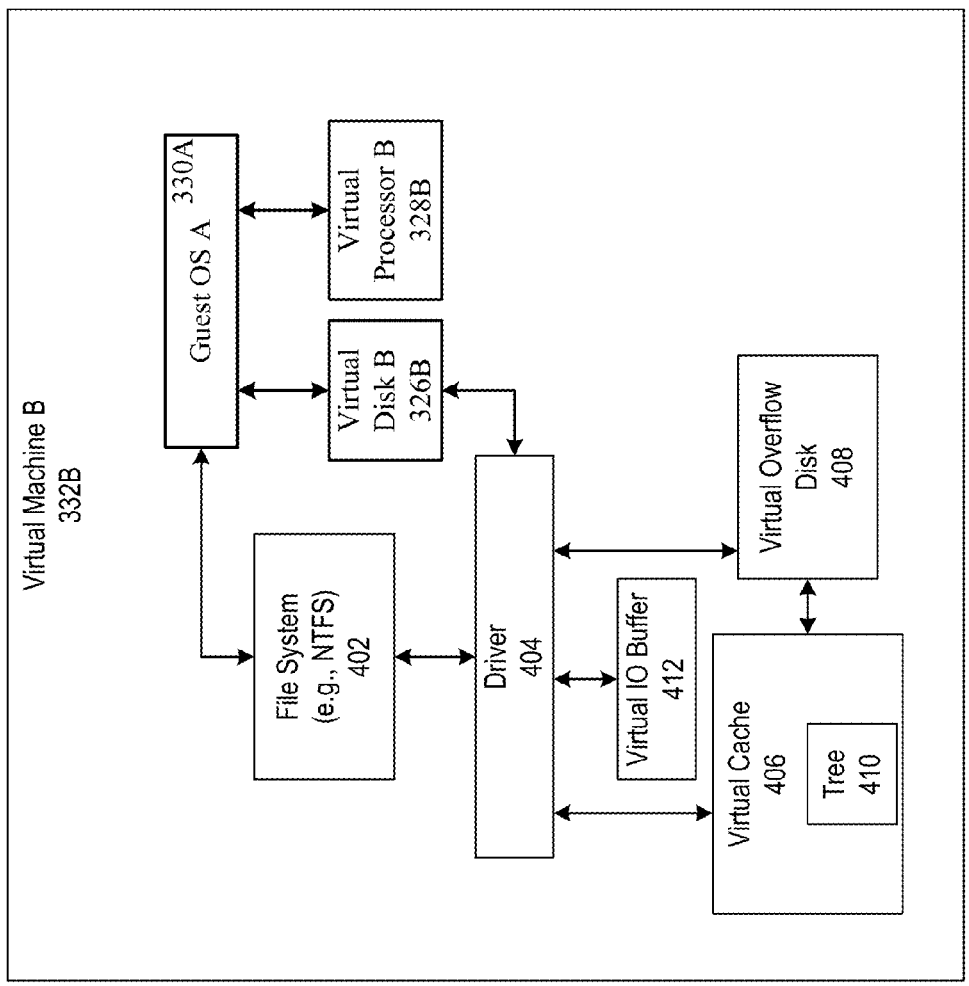
FIG. 4 depicts an illustrative virtual machine in accordance with one or more illustrative aspects described herein.

FIG. 4 depicts an illustrative virtual machine 400 (e.g., virtual machine B 332B) in accordance with one or more illustrative aspects described herein. As shown in FIG. 4 and noted above, virtual machine B 332B may include guest operating system A 330A, a virtual processor B 328B, and virtual disk B 326B. In addition, virtual machine B 332B may include a file system 402, such as, for example, a new technology file system (NFTS), which is a file system that may be used by guest OS A 330A for storing and retrieving files. File system 402 may include one or more filters for identifying files. Virtual machine B 332B may also include a driver 404, which is an in-guest driver that communicates with guest OS A 330A and may be responsible for coordinating storage and retrieval of blocks in virtual cache 406 and virtual overflow disk 408. Driver 404 may permit data associated with the virtual disk B 326B (also referred to herein as an underlying system disk) to be cached in the virtual cache 406. Additionally, driver 404 may coordinate overflow of blocks of data from virtual cache 406 to the virtual overflow disk 408 to reduce the input/output operations per seconds (IOPs) hit on virtual disk B 326B, which increases memory performance. Virtual overflow disk 408 may be local volatile storage specific to virtual machine B 332B and specified by hypervisor 302. Alternatively, the virtual overflow disk 408 may be non-volatile storage rather than volatile storage as long as a specific offset and range is used to write the blocks overflowing into the virtual overflow disk 408. In some instances, one or more of the virtual memories (e.g., virtual cache 406, virtual overflow disk 408, etc.) may be created by the hypervisor 302 or another managing entity. Each of the virtual cache 406, the virtual overflow disk 408, and/or the virtual disk B 326B may store data in blocks.

Virtual cache 406 uses an internal mechanism to specify a block size for the blocks stored in virtual memory. The block sizes of the blocks stored in virtual memory do not have to match the block size of physical blocks stored in a physical disk. For instance, the block size of a physical block may be the sector size (e.g., 512 bytes) and the block size of a block in the virtual memory may be a multiple of the sector size not to exceed a configurable maximum block size (e.g., 2,048 bytes). The maximum block size of a block in virtual memory may be configurable by the hypervisor or another entity such as a system administrator during provision of a virtual machine (e.g., virtual machine B 332B). Thus, for one virtual machine, the maximum block size may be 2,048 bytes and, for a different virtual machine, the maximum block size may be 1,024 bytes (or some other multiple of the sector size). One or more blocks in virtual memory may have the same block size as other blocks in virtual memory and may have a different block size from other blocks in virtual memory. While the maximum block size may be any multiple of the sector size, the minimum permitted block size of each block in virtual memory may be equal to the size of a sector of memory. For instance, the driver 404 might not create a block that has a block size that is less than the sector size.

When the guest operating system 330A receives a write command including a chunk of data (e.g., a file) from a request IO issuer (not shown), the guest operating system 330A may determine the size of the chunk of data. If the size of the chunk of data is not equal to a multiple of a sector size, the guest operating system 330 may increase the size of the chunk of data so that the increased size of the chunk of data is equal to a multiple of the sector size. The size of the chunk of data may be increase by appending and/or otherwise adding filler (e.g., garbage data) to the chunk of data. In one example, the sector size may be 500 bytes and the chunk of data may be 1,200 bytes. In such an example, because 1,200 bytes is not equal to multiple of 500 bytes, the guest operating system 330A may increase the chunk of data to be 1,500 bytes, which is a multiple of 500 bytes. The guest operating system 330A may generate a write command that includes the increased size of the chunk of data (e.g., 1,500 bytes in this example). As a result, each write command discussed herein may include chunks of data that is equal to a multiple of the sector size. In addition and as will be discussed in further detail below, the write command may also include an offset and a range. The guest operating system 330A may transmit the write command to the driver 404, which may then add the chunks of data to existing blocks stored in the virtual cache 406 and/or create new blocks from the chunks of data and store the new blocks in the virtual cache 406.

In one or more arrangements, the driver 404 may be responsible for managing the block size of each block. A block size of one block may be different from a block size of another block. In addition, the block size of a block may be at least equal to the sector size but less than or equal to a configurable maximum block size, which may be a multiple of the sector size. The maximum block size may be set by the hypervisor, a system administrator, or another entity. As a result, if a chunk of data received in a write command has a size greater than a maximum block size, the driver 404 may divide the chunks of data into one or more blocks. The driver 404 may create a block having the maximum block size before creating a next block. Because each of the maximum block size and the chunks of data received in the write command is a multiple of the sector size, the last block formed by the division of chunks of data will be have a block size that is equal to the sector size or a multiple of the sector size. As used herein, a block being written to the virtual cache 406 may referred to as a write block.

Typically, a virtual cache may attempt to increase in-guest performance by caching read blocks. That is, when a read command is received from an input/output (TO) request issuer and some of the requested blocks are not currently cached in virtual memory, those blocks may be read from the underlying virtual system disk and written into the virtual cache. The virtual cache may, in turn, coalesce the blocks with other requested blocks previously stored in the virtual cache and send each of these requested blocks to the IO request issuer to service the read command. However, by writing the blocks read from the underlying virtual system disk to the virtual cache in order to service the read request, additional memory of the virtual cache is unnecessarily utilized and/or otherwise made unavailable. This may quickly lead to the virtual cache having insufficient space to store blocks thereby triggering an overflow condition.

In contrast, virtual cache 406 might not attempt to increase in-guest performance by writing the blocks read from the underlying virtual disk B 326B into virtual cache 406. Indeed, virtual cache 406 or driver 404 may actively prevent and/or otherwise inhibit retrieval and/or reception of blocks read from underlying system disk B 326B to be written to virtual cache 406 to service a read command. Instead of writing blocks read from the virtual disk B 326 B to the virtual cache 406, the blocks may be written to a virtual IO buffer 412. Further, the blocks read from the virtual cache 406 may also be written to the virtual IO buffer 412 and coalesced with the other read blocks therein. The coalesced blocks in the virtual IO buffer 412 may then be used to service the read command e.g., by sending the blocks to the read command issuer. As used herein, blocks read from virtual memory may be referred to as read blocks.

However, virtual cache 406 and/or driver 404 may permit caching of write blocks (e.g., blocks cached in response to receiving of a write command). As a result of preventing blocks that are read from the virtual disk B 326B from being written to the virtual cache 406, only write blocks may be cached thereby minimizing use of the virtual cache 406 and the virtual overflow disk 408.

In addition, when a virtual overflow disk is entirely utilized, a virtual machine needs to be rebooted thereby ending a user's session. Since virtual cache 406 and virtual overflow disk 408 are utilized (e.g., filled up) at a slower rate than that of the typical virtual cache and virtual overflow disk described above, the lifetime of the user's session is extended. In one or more arrangements, the virtual overflow disk 408 may be the same size as the virtual disk B 326B. In such arrangements, the virtual overflow disk 408 might not ever be filled. As a result, virtual machine B 332B might not ever need to be rebooted provided that there is no update to the base operating system or defragmentation operation on the base operating system disk.

Figure 5:
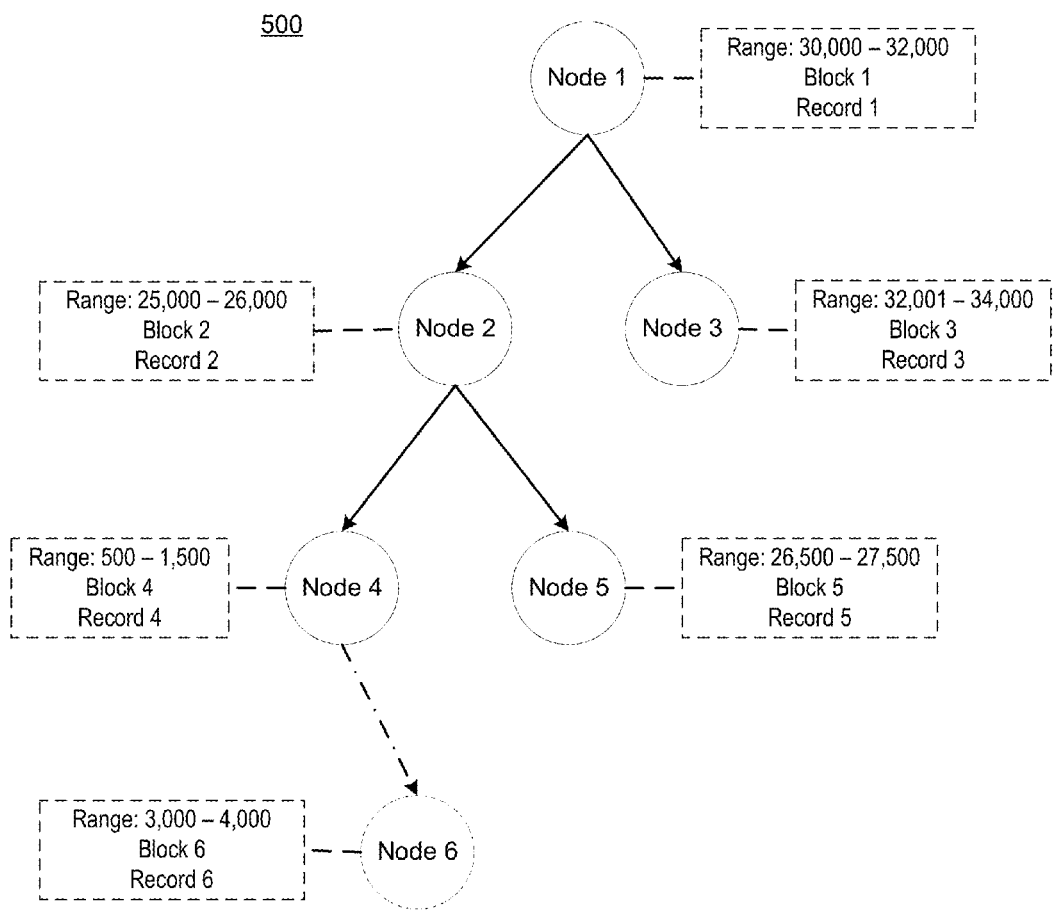
FIG. 5 depicts an illustrative self-balancing search tree in accordance with one or more illustrative aspects described herein.

Upon receiving a first-in-time write command, the driver 404 may dynamically generate a search tree (e.g., self-balancing search tree 410) and a global linked list (e.g., global linked list 600 as shown in FIG. 6A). The global linked list may map where blocks are stored in the virtual cache 406 and/or the virtual overflow disk 408. The self-balancing search tree 410 (e.g., an AVL tree) may be an index of the global linked list. An example search tree 500 is depicted in FIG. 5. The global linked list and/or the search tree 410 may be stored in the virtual cache 406 in a volatile, non-paged pool. A node of the search tree 410 may correspond to a particular memory range in virtual disk B 326B and be associated with one block stored in the virtual cache 406 or virtual overflow disk 408. The node may include a pointer to a specific record (e.g., linked list entry) for the block in the global linked list. The record for the block may include a pointer to the block's location in the virtual cache 406 if stored in the virtual cache 406, an offset to the block's location in the virtual overflow disk 408 if stored in the virtual overflow disk 408, the block size for the block, the block's position in a least recently used list, a pointer back to the tree 410, etc.

As used herein, a range associated with a node may refer to a particular memory range in virtual disk B 326B. Similarly, a requested range associated with a write, read or trim command may also refer to a particular memory range in virtual disk B 326B.

As new write blocks associated with a write command are obtained by the driver 404, a new node for each new block may be dynamically added to the tree 410 and a new record in the global linked list may be generated for use with the new node. Further, as blocks in the virtual cache 406 or the virtual overflow disk 408 are adjusted or moved, the corresponding nodes and records may also be updated. As a result of the dynamic generation and modification of the search tree 410 and because the virtual overflow disk 408 is designed to be volatile, the need for allocating a persistent table of contents mapping all of the virtual memory is eliminated thereby reducing boot time. Since the search tree 410 and global linked list only map received write blocks, the size of the search tree 410 and the global linked list is minimized and is much smaller than that of a typical table of contents for an equivalent fixed size virtual cache. As a result, available storage on the virtual cache 406 is maximized.

The virtual overflow disk 408 may, in some instances, be a raw and/or otherwise unformatted, and, in other instances, may be formatted. Use of a raw, unformatted virtual overflow disk 408 may increase write performance (e.g., writing of write blocks) and throughput. For instance, by using a raw virtual overflow disk, there is no need to perform an extra write to a table of contents or persistent table for the virtual overflow disk, which reduces IOPs associated with the virtual overflow disk 408. In some cases, the virtual overflow disk 408 may be formatted (e.g., not a raw disk). In such cases, a designated section of the virtual overflow disk 408 may be used as the overflow area for blocks transferred from the virtual cache 406. The boundaries of the designated section of the virtual overflow disk 408 may be specified by a preset offset and a range.

In one or more arrangements, the virtual overflow disk 408 may be sized to be at least equal to the size of the free space on the virtual disk B 326B for which it is serving as a cache. In such arrangements, absent an update to the base operating system or defragmentation operation to the base operating system, the virtual machine B 322B might not ever need to be periodically rebooted to clear/reset the virtual overflow disk 408 since the virtual overflow disk 408 cannot be filled and/or otherwise exhausted. Because of the size of the virtual overflow disk 408, reuse of freed memory of the virtual overflow disk 408 identified in a free list (described in detail below), and deletion of various blocks in the virtual cache 406 and the virtual overflow disk 408 in response to receiving a trim message (described in detail below), the virtual overflow disk 408 might not ever have insufficient space to store a write block at any point during operation of the virtual machine B 332B thereby obviating the need to reboot the virtual machine B 332B.

FIG. 5 depicts an illustrative self-balancing search tree 500 (e.g., tree 410), according to one or more aspects discussed herein. The self-balancing search tree 500 (e.g., an AVL tree) may be used to find appropriate records in a global linked list (e.g., global linked list 600 depicted in FIG. 6A) to aid in servicing a write or read command. The search tree 500 may be a binary tree in the sense that only one or two child nodes may branch from a parent node (e.g., a parent node cannot have 3 child nodes directly branching from it). Each node in the tree 500 may correspond to different ranges of memory in the virtual disk B 326B, which may be specified in bytes. Further, a range associated with one of the nodes might not overlap any ranges associated with any of the other nodes in the search tree 500.

As shown in FIG. 5, the search tree 500 may include multiple nodes (e.g., 5 nodes) with each node corresponding to a different block stored in either the virtual cache 406 or the virtual overflow disk 408. Each node may include a node identifier, a range specified in bytes, a block identifier, a record identifier, and a pointer to the record in the global linked list. In this example, the root node (e.g., node 1) has a first range (e.g., 30,000 to 32,000) and corresponds to a first block (e.g., block 1). The root node may include a pointer to a record for the first block in the global linked list (e.g., record 1). Node 2 has a second range (e.g., (25,000 to 26,000) and corresponds to a second block (e.g., block 2). Node 2 may include a pointer to a record for the second block in the global linked list (e.g., record 2). Node 3 has a third range (e.g., 32,001 to 34,000) and corresponds to a third block (e.g., block 3). Node 3 may include a pointer to a record for the third block in the global linked list (e.g., record 3). Node 4 has a fourth range (e.g., 500 to 1,500) and corresponds to a fourth block (e.g., block 4). Node 4 may include a pointer to a record for the fourth block in the global linked list (e.g., record 4). Node 5 has a fifth range (e.g., 26,500 to 27,500) and corresponds to fifth block (e.g., block 5). Node 5 includes a pointer to a record for the fifth block in the global linked list (e.g., record 5).

A range of a node in the search tree 500 may correspond to a block size. As a result, the boundaries of each range for a node in the search tree 500 may align with a multiple of the sector size.

Search tree 500 is setup such that a highest value of a range for a child node to the left of a parent node is lower than a lowest value of a range of the parent node. For example, node 2 is the left child node of node 1. The highest value of the range for node 2 is 26,000, which is less than 30,000 (the lowest value of the range for node 1). Further, search tree 500 is setup such that a lowest value of a range for a child node to the right of the parent node is higher than a highest value of the range of the parent node. For example, node 3 is the right child node of node 1. The lowest value of the range for node 3 is 32,001, which is greater than 32,000 (the highest value of the range for node 1).

Each child node may define a separate sub-tree. For instance, node 2 may define a first subtree that includes nodes 2, 4 and 5. For instance, node 3 may define a different sub-tree that includes node 3. For instance, node 4 may define yet another sub-tree that includes node 4. As discussed above, search tree 500 is self-balancing. The height of two child subtrees of a particular parent node may differ by only a preset value configured at session startup. If the two child subtrees differ by more than the preset value, the search tree 500 may rebalance its nodes so that the two child subtrees do not differ by more than the preset value. As an example, the preset value may be 1 in the case of AVL trees. In such an example, if node 6 (shown in FIG. 5) were added to the search tree 500, the subtree for node 2 would have a height of 3 nodes and the subtree of node 3 would have a height of 1 node. Because the difference in height (e.g., 2) is greater than the preset value (e.g., 1), the search tree 500 may rebalance its nodes so that the two child sub-trees do not differ in height by more than the preset value. A benefit of rebalancing the search tree 500 is to speed up the lookup process discussed in further detail below.

As discussed above, driver 404 may be responsible for managing search tree 500 and may dynamically add new nodes or update existing nodes of the tree 500 to account for blocks written to the virtual cache 406. For instance, the driver 404 may adjust a range of one of the nodes. For instance, another node may be added to the search tree 500. In some cases, this may be done during rebalancing of the search tree 500. Any changes made to search tree 500 may also be made in global linked list 600 depicted in FIG. 6A.

The driver 404 may use the search tree 500 to find one or more records in a global linked list (e.g., global linked list 600) to aid in servicing a write command or a read command. For instance, a write command or a read command may include an offset relative to the virtual system disk B 326B and a length. Both the offset and the length may be specified in bytes. The driver 404 may determine a requested range from the offset and length. For instance, the range may begin at the offset and extend the specified length. Thus, the offset may end at a summation of the offset and the length. This range may be referred to herein as the requested range.

The driver 404 may search the tree 500 to identify nodes having ranges that overlap the requested range. The search may be a recursive or iterative process. For instance, the driver 404 may traverse the search tree 500 by examining a range of a current node and if any of the values in the requested range are less than the lowest value of the range of the current node, the search may proceed to search current node's left child node. In addition, if any of the values in the requests range are greater than a highest value of the current node, the search may also proceed to the current node's right child node. The child nodes may then become the current nodes and the process may repeat. The search process may begin with the root node (e.g., node 1) as the current node. If a node has a range which at least partially overlaps the requested range, the driver 404 may identify that node in a search result. Otherwise, if a node has a range that does not overlap any value of the requested range, the driver 404 might not identify that node in the search result. As an example, if the requested range is 25,500-27,000, nodes 2 and 5 may be identified as at least partially overlapping the requested range and, thus, may be included in the search result.

Since each node includes a pointer to a different record in the global linked list (e.g., global linked list 600 depicted in FIG. 6A), the driver 404 may use the pointers of the identified nodes to identify and retrieve corresponding records in the global linked list. In the above example, record 2 and record 5 may be retrieved from the global linked list 600.

As shown in FIG. 6A, the global linked list 600 may include multiple records with each record being specific to a different node in the search tree 500. The global linked list 600 may include record IDs, node IDs, block IDs, pointers to locations of blocks in the virtual cache 406, an offset index for locations of blocks in the virtual overflow disk 408, block sizes, and a pointer (or entry referring) to the block's position in the least recently used list for the blocks stored in the virtual cache 406.

Each record may include a record ID, a node ID of the corresponding node in the search tree 500, a block ID for the corresponding block, and a range associated with the block that is relative to the virtual system disk B 326B. If a block associated with the record is stored in the virtual cache 406, the record may include a pointer to the location of the block in the virtual cache 406 and its offset in the offset index may be null. As an example, as shown in FIG. 6A, blocks 1 and 2 are stored in the virtual cache 406 so their corresponding records include a pointer to their location in the virtual cache 406 (e.g., the pointers point to memory that was dynamically allocated from a non-paged pool). As a result, the virtual cache 406 might not be a large static entry and might not be pre-allocated from a set range upon initiating the virtual machine. Instead, multiple non-contiguous memory allocations may collectively and dynamically form the virtual cache 406. The data is stored completely randomly in the non-paged pool and indexed by the global linked list 600. The offsets in the virtual overflow disk 408 may be null for blocks 1 and 2. The driver 404 may identify the block's starting address using the pointer and may determine its ending address using the block's block size. For instance, if the pointer points to location x and the block has block size y, then the starting location of the block in the virtual cache 406 is x and its ending address is x+y.

If the block is not stored in the virtual cache 406 and is instead stored in the virtual overflow disk 408, the pointer to the block's location in virtual cache 406 may be null (e.g., no memory allocated from the non-paged pool) and the offset relative to the virtual overflow disk 408 where the block is stored in the virtual overflow disk 408 may be a non-null valid value. As an example, as shown in FIG. 6A, blocks 3 and 4 may be stored in the virtual overflow disk 408 so their corresponding records may include the offset (e.g., starting location) at which each of the blocks is stored in the virtual overflow disk 408, and their pointers to the virtual cache 406 may be null. The driver 404 may identify the block's starting address as the offset and may determine its ending address using the block's block size. For instance, if the offset is b and the block has block size c, then the starting location of the block in the virtual overflow disk 408 is b and its ending address is b+c.

In some cases, when the driver 404 stores blocks in the virtual cache 406, it stores them in sequential storage areas of the virtual cache 406. As a result, two adjacent blocks stored in the virtual cache 406 might not have any free memory space between them. In addition, the global linked list 600 may include, for each record, a next pointer that points to a location of a next block in the virtual cache 406 and a previous pointer that points to a location of a previous block in the virtual cache 406.

Similarly, when blocks are overflowed from the virtual cache 406 to the virtual overflow disk 408, the overflowed blocks may be written in sequential storage areas of the virtual overflow disk 408. As a result, two adjacent blocks stored in the virtual overflow disk 408 might not have any free memory space between them (unless a block has been freed due to a trim message which will be discussed in further detail below). As a result, as the overflowed blocks are moved to the virtual overflow disk 408, the offset of a block being stored in the virtual overflow disk 408 may be determined by summing the previous offset and the block size of the previous block stored at the previous offset in the virtual overflow disk 408.

As an example, a first offset (e.g., offset 1 in FIG. 6A) in the virtual overflow disk 408 may be 0 (or some other initial value) and may be incremented by the block size of block 3 stored in the virtual overflow disk 408 beginning at offset 1. Consequently, the second offset (e.g., offset 2) in the virtual overflow disk 408 may be equal to the sum of offset 1 and the block size of block 3. The third offset (e.g., offset 3) may be equal to the sum offset 2 and the block size of block 4 (e.g., the block stored beginning at offset 2), and so on. As an example, if offset 2 is 1,500 bytes and block size of the block stored in the virtual overflow disk 408 beginning at offset 2 is 1,000 bytes, then offset 3 may equal 2,500 bytes.

In some cases, a non-zero first offset may be beneficial if only a certain portion (e.g., a particular file) of the virtual overflow disk 408 can be used for storing blocks overflowed from the virtual cache 406.

As noted above, the global linked list 600 may include a least recently used list, which may be a list of position indicators for the blocks stored in the virtual cache 406. The position indicated may be assigned (and reassigned) to the blocks stored in the virtual cache 406 based on their use to service read and write commands. The most recently used block may be specified as $T_x$ in its record where x may be 0 or some other initial value. The next most recently used block may be specified as $T_{x+1}$. The next most recently used block may be specified as $T_{x+2}$, and so on. The least recently used block may be specified as $T_{x+n}$. The least recently used list may include pointers (not shown) to records associated with the previous and next position indicators in the least recently used list. In addition, the pointer to the record associated with previous position indicator for the most recently used block $T_x$ may be the least recently used block $T_{x+n}$. As blocks are used they are added to or moved to the head of the least recently used list and assigned the position indicator $T_x$. In such cases, the position indicators of each of the other blocks in the least recently used list are incremented by one. As an example, if a block's position indicator is $T_{x+1}$, then its updated position indicator is $T_{x+2}$. When a block needs to be removed from the virtual cache 406 in order to make room for another block, the removed block may be selected on the basis that it is the least recently used block stored in the virtual cache 406. Thus, the block having position indicator $T_{x+n}$ may be removed from the virtual cache 406 and stored in the virtual overflow disk 408, and so on if additional blocks need to be overflowed to the virtual overflow disk 408.

FIG. 6B depicts an illustrative free list 602 in accordance with one or more aspects discussed herein. Free list 602 may be responsible for tracking storage space that becomes available for use in the virtual overflow disk 408 after removing a block from that storage space so that the available storage space can be reused to store another block. The free list 602 may be a list of offsets to locations of the virtual overflow disk 408 where blocks have been previously stored but have since been freed (e.g., removed/deleted). For instance, when a block is removed from the virtual overflow disk 408, the offset where the block was stored in the virtual overflow disk 408 and the block's block size are stored in the free list 602. The block size may correlate to the available space in the virtual overflow disk 408 beginning at the corresponding offset. The driver 404 may use the offsets and the block size to identify available freed storage space in the virtual overflow disk 408. For instance, the available storage space may begin at the offset and end at the sum of the offset and the block size. As the driver 404 overflows blocks from the virtual cache 406 to the virtual overflow disk 408, the driver 404 may determine whether the overflowed block can be stored in any available storage space specified by the free list 602. If so, the overflowed block may be stored in the available space and that now unavailable storage space may be removed from the free list 602. In addition, the record of the overflowed block may be updated (e.g., its pointer to its location in the virtual cache 406 may be set to null and its offset in the virtual overflow disk 408 may be set to the value specified by the free list 602). Otherwise, if the block cannot fit in the available space specified by the free list 602, then the block may be stored in the virtual overflow disk 408 using the methodologies discussed above (e.g., by incrementing the highest offset in the global linked list 600 by the corresponding block's block size).

In some cases, the free list 602 may be in the form of map indexed by size. For example, the map may include a set of free list entries for overflow[blocksizeA] and overflow [blocksizeB] where blocksizeA and blocksizeB are two discrete sizes. As a result, the time taken to find a free entry is of order 1.

Figure 7:
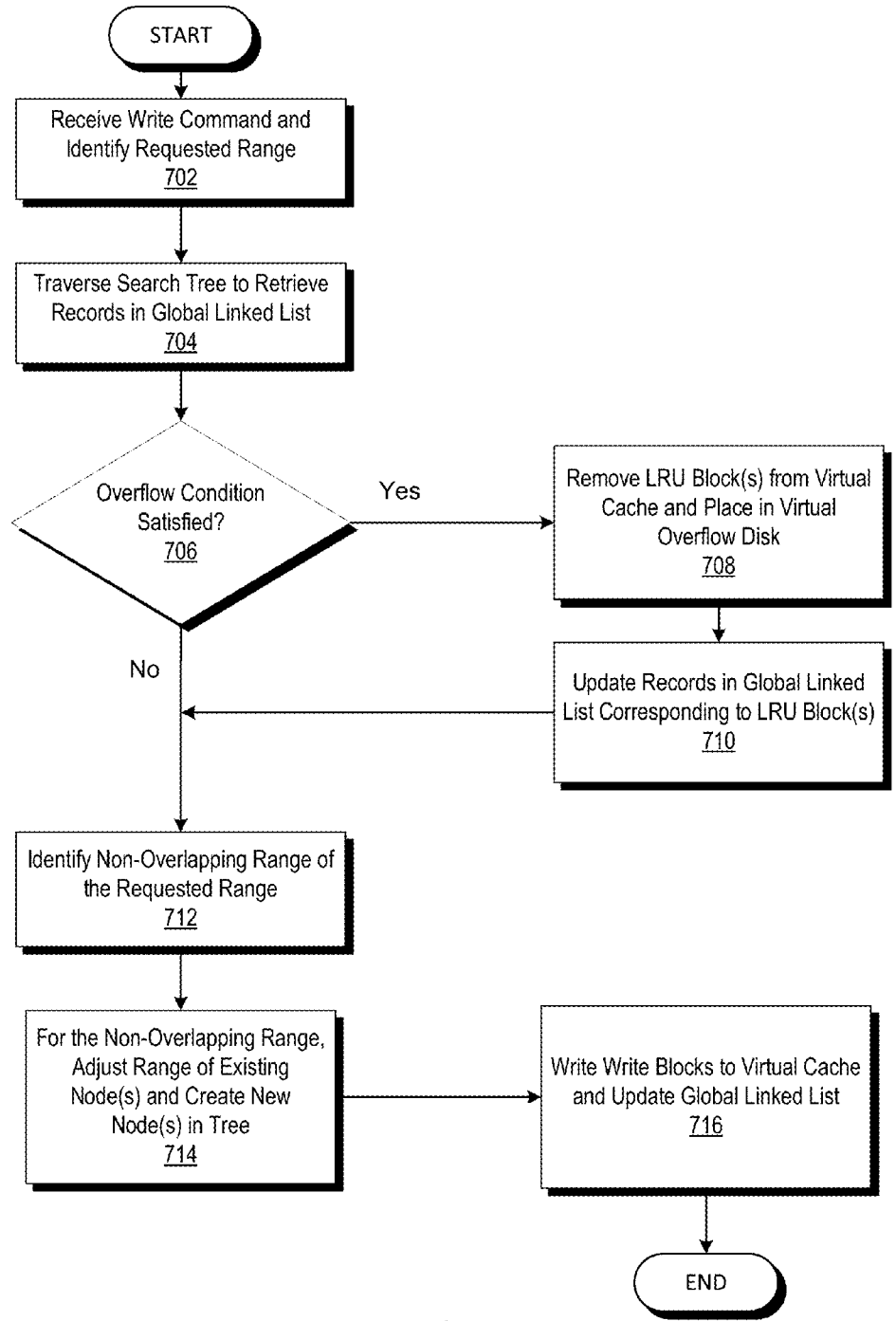
FIG. 7 depicts an illustrative flow for processing a write command and managing virtual memory, in accordance with one or more illustrative aspects discussed herein.

FIG. 7 depicts an illustrative flow of processing a write command and management of virtual memory, in accordance with one or more illustrative aspects discussed herein. In one or more embodiments, the steps of FIG. 7 and/or one or more steps thereof may be performed by driver 404, hypervisor 302, and/or another entity. In other embodiments, the method illustrated in FIG. 7 and/or one or more steps thereof may be embodied in computer-executable instructions that are stored in a computer-readable medium, such as a non-transitory computer-readable memory. In some instances, one or more of the steps of FIG. 7 may be performed in a different order. In some instances, one or more of the steps of FIG. 7 may be omitted and/or otherwise not performed. Prior to beginning the steps of FIG. 7, the session instance of the virtual machine B 332B may have already been initiated by hypervisor 302.

The method may begin at step 702 in which driver 404 may intercept and/or otherwise receive a write command from an IO request issuer (e.g., a virtual application, the guest OS, hypervisor 302, etc.) who wishes to write data to the virtual system disk B 326B, and identify a requested range associated with the write command. The write command may include data to be written (e.g., a file or other chunk of data) and a memory location in the virtual system disk B 326B, which may indicate where the data is to be written in the virtual disk B 326B. The chunk of data may have a size equal to a multiple of the sector size. The memory location may be specified in terms of an offset in the virtual system disk B 326B and a length. Both the offset and the length may be specified in bytes. The driver 404 may identify a requested range associated with the write command. For instance, the driver 404 may identify the offset as the starting value of the requested range and the summation of the offset and length as the ending value of the requested range. As an example, if the offset is 24,000 and the length is 10,000, then the requested range may be from start at 24,000 and end at 34,000.

At step 704, the driver 404 may traverse the search tree 500 to retrieve records that correspond to the requested range from the global linked list 600. Each node of the search tree 500 may correspond to a different range of memory locations in the virtual system disk B 326B. The nodes of the search tree 500 might not account for every range of memory locations in the virtual system disk B 326B. Instead, there may only be nodes in the search tree 500 for ranges of memory locations in the virtual system disk B 326B where data may have also been stored in the virtual cache 406 and/or the virtual overflow disk 408.

In one or more arrangements, the driver 404 may iteratively traverse the search tree 500 and identify one or more nodes in the search tree 500 having a range that at least partially overlaps the requested range determined from the write command. The driver 404 may traverse the search tree 500 in a manner as discussed above in connection with FIG. 5 and identify nodes having a range that at least partially overlaps the requested range. In one example, if the requested range is from 24,000 to 34,000, then nodes 1-3 and 5 may be identified and the other nodes in the search tree 500 might not be identified. The driver 404 may retrieve the records in the global linked list 600 corresponding to the identified nodes using the pointers to the records included in the nodes. The driver 404 may identify these records as being associated with the requested range.

Alternatively, rather than iteratively traversing the search tree 500 to identify each node that has a range that at least partially overlaps the requested range, the driver 404 may traverse the search tree 500 to identify first node that has a lowest range that at least partially overlaps the requested range. The driver 404 may retrieve the first node's record in the global linked list 600. As noted above, each record in the global linked list 600 may include a next pointer. The next pointer may point to the next record in the global linked list 600. The driver 404 may identify and retrieve the next record from the global linked list 600 using the next pointer. The driver 404 may determine whether the range associated with the next record at least partially overlaps the requested range. If so, the record may be identified as being associated with the requested range. The driver 404 may then repeat the process by using the next pointer in the identified record to obtain and inspect the next pointer, and so on. If the next record does not have a range that at least partially overlaps the requested range, the driver 404 might not identify the record as being associated with the requested range and might not retrieve the next record.

For records identified as being associated with the requested range, the driver 404 may retrieve those records from the global linked list 600 using the nodes' pointers to the records. Following the above example, the driver 404 may retrieve records 1-3 and 5 from the global linked list 600.

At step 706, the driver 404 may determine whether an overflow condition for virtual cache 406 has been satisfied. For instance, driver 404 may inspect virtual cache 406 to identify characteristics of virtual cache 406 for use in determining whether an overflow condition has been satisfied. The overflow condition may be set by a system administrator, hypervisor 302, a session manager, a virtual machine manager, a memory manager, and the like. Further, the overflow condition may be static or dynamic.

As an example, an overflow condition may be whether the virtual cache 406 can increase and/or otherwise grow to a sufficient size to store each of the chunks of data received in the write command. The driver 404 may have knowledge of a maximum potential size threshold of the virtual cache 406, which the driver 404 may receive during session startup. The maximum potential size threshold of the virtual cache 406 may be a watermark limit up to which the virtual cache 406 can increase. The virtual cache 406 might not be allocated at session startup. Instead, the virtual cache 406 is dynamically increased in size by allocating memory each time data is added to the virtual cache 406 (e.g., adding new blocks, adding to existing blocks, etc.) until the maximum potential size threshold is exceeded.

A byte counter representing a number of bytes requested from the non-paged pool and allocated to the virtual cache 406 may be used to determine whether an overflow condition has been satisfied. Each time data is added to the virtual cache 406 (e.g., adding new blocks, adding to existing blocks, etc.), the driver 404 may increment the byte counter by that amount of added data (e.g., the block's block size for newly added blocks).

The driver 404 may determine a potential total byte size of the virtual cache 406 that represents a potential size of the virtual cache 406 would have if the chunks of data received in the write command are added to the virtual cache 406 (e.g., by storing new blocks of the chunks of data in the virtual cache 406 and/or by adding portions of the chunks of data to blocks already stored in the virtual cache 406). For instance, the driver 404 may compute the potential total byte size of the virtual cache 406 by summing the byte counter and the amount of bytes of the chunks of data received with the write command. If a portion of the chunks of data has the same range as a block already stored in the virtual cache 406, the byte size of this portion of the chunks of data might not be included in the amount of bytes of the chunks of data because this portion of the chunks of data will overwrite the block already stored in the virtual cache 406 and, thus, not cause the virtual cache 406 to increase in size and/or otherwise grow.

The potential total byte size may then be compared with the maximum potential size threshold of the virtual cache 406. If the potential total byte size is less than or equal to the maximum potential size threshold of the virtual cache 406, then the driver 404 may determine that the overflow condition has not been satisfied and the process may proceed to step 712. Otherwise, if the total potential byte size is greater than the maximum potential size threshold of the virtual cache 406, the driver 404 may determine that the overflow condition has been satisfied and the process may proceed to step 708. In some cases, the byte counter may be decremented when blocks are removed from the virtual cache 406 via a trim command.

At step 708, the driver 404 may, in order to make space to store the chunks of data in the virtual cache 406, remove the least recently used blocks from the virtual cache 406, and place them in the virtual overflow disk 408. For instance, the driver 406 may overflow the minimum number of blocks in the virtual cache 406 to provide sufficient space to store the chunks of data in the virtual cache 406. For instance, the driver 404 may determine the amount of available/unused space in the virtual cache 406 when the virtual cache 406 is at its maximum size (e.g., the maximum potential size threshold of the virtual cache 406), which may be equal to the maximum potential size threshold of the virtual cache 406 minus the byte counter and plus the block size of any blocks in the virtual cache 406 that are designated to be overwritten.

The driver 404 may compute the difference between the byte size of the chunks of data and the determined amount of available/unused space in the virtual cache 406. The difference may reflect the amount of data that has to be removed from the virtual cache 406. The driver 404 may identify the least recently used blocks using the least recently used list of the global linked list 600. The driver 404 may determine the minimum number of blocks to be removed from the virtual cache 406 based on the amount of data that has to be removed from the virtual cache 406 and the block sizes of the least recently used blocks stored in the virtual cache 406.

As discussed above, each record includes a position indicator in the least recently used list with $T_x$ representing the most recently used block, $T_{x+1}$ representing the next most recently used block, and so on. $T_{x+n}$ may represent the least recently used block. Each position indicator may include a next pointer pointing to the record having the next sequential position indicator. As an example, a next pointer for $T_{x+2}$ points to the record associated with $T_{x+3}$. In addition, each position indicator may include a previous pointer pointing to the record having the previous sequential position indicator. As an example, a previous pointer for $T_{x+2}$ points to the record associated with $T_{x+1}$.

As also indicated above, the previous pointer for the position indicator $T_x$ points to the record associated with the least recently used block (e.g., the record having position indicator $T_{x+n}$). As an example, the driver 404 may identify block 5 as the least recently used block since a previous pointer of the record (e.g., record 6) having $T_x$ points to record 5. The driver 404 may identify and remove block 5 from the virtual cache 406. The driver 404 may then determine whether another block needs to be removed from the virtual cache 406 by summing the block sizes of the blocks that have been removed from the virtual cache 406. If the summed block size of removed blocks is less than the determined amount of data that has to be removed from the virtual cache 406, the driver 404 may remove the next least recently used block and repeat the process (e.g., summing the blocks sizes of removed blocks and determining whether another block needs to be removed from the virtual cache 406). As a result, the driver 404 may continue to remove blocks until there is sufficient available/unused space in the virtual cache 406 to store the chunks of data. If the summed block size of removed blocks is greater than or equal to the determined amount of data that has to be removed from the virtual cache 406, the driver 404 may stop removing blocks from the virtual cache 406 since there is sufficient available/unused space in the virtual cache 406 to store the chunks of data received in the write command.

In order to remove a block from the virtual cache 406, the driver 404 may use the block's corresponding record in the global linked list 600 to obtain the block's pointer to its location in the virtual cache 406 and block size, and remove the block from the virtual cache 406. As an example, the driver 404 may use record 5's pointer to block 5 in the virtual cache 406 to remove block 5 from the virtual cache 406. Alternatively, rather than removing the block from the virtual cache 406, the driver 404 might not remove the block from the virtual cache 406. Instead, the driver 404 may designate the block as a block to be overwritten by the chunks of data received in the write command.

The driver 404 may examine the offset index in the global linked list 600 and the free list 602 to determine where to place, in the virtual overflow disk 408, the blocks removed from the virtual cache 406 (or, alternatively, designated to be overwritten). Following the above example, in order to place block 5 in the virtual overflow disk 408, the driver 404 may first identify unused memory in the virtual overflow disk 408 by examining the offset index and the free list 602. In some cases, the driver 404 may attempt to reuse offset values in the free list 602 prior to creating new offset values in the offset index as it may be preferable to reuse freed space in the virtual overflow disk 408 to store blocks rather than storing blocks in previously unused space in the virtual overflow disk 408.

The driver 404 may select one of the offsets listed in the free list 602 as the offset at which to begin storing block 5. For instance, the driver 404 may inspect record 5 in the global linked list to identify the block size of block 5. The driver 404 may also determine the available space associated with each offset in the free list 602, which may be specified in the free list 602. In some instances, the driver 404 may be configured to select the lowest offset value to promote spatial proximity of blocks in the virtual overflow disk 408, which may enable faster retrieval of the blocks. As discussed above, in some cases, the free list 602 may be a map indexed by block size.

In some instances, the driver 404 may determine that a block (e.g., block 5) cannot be stored beginning at any offset listed in the free list 602. In one example, the driver 404 may determine that none of the listed available spaces in the free list 602 is sufficiently large enough to store block 5 (e.g., based on a comparison of each listed available space with the block size of block 5). In another example, the free list 602 might not have any listed offsets in the virtual overflow disk 408 either when no blocks have been removed from the virtual overflow disk 408 or when each of the freed memory locations have been reused by storing other blocks in the freed memory locations.

If the driver 404 determines that block 5 cannot be stored beginning at any offset listed in the free list 602, then the driver 404 may compute the next available/free offset in the virtual overflow disk 408. For instance, the driver 404 may use global linked list 600 to identify the highest offset value in the offset index and the block size of the block stored at that offset to determine the next free offset in the virtual overflow disk 408. As shown in FIG. 6A, inspection of the offset index reveals that offset 2 is the last used offset by identifying the highest offset value in the offset index. The driver 404 may then determine offset 3 by summing offset 2 with the block size of block 4 and store block 5 in the virtual overflow disk 408 beginning at offset 3.

At step 710, the driver 404 may update records of the global linked list 600 based on each of the least recently used blocks transferred from the virtual cache 406 to the virtual overflow disk 408. The offset index may be updated so that the record of the transferred block includes the offset at which the block was stored in the virtual overflow disk 408. In addition, the pointers to the locations of such blocks in the virtual cache 406 may be set to null and the memory that was associated with these pointers may be released back to the guest operating system 330A, or reused to store an incoming chunks of data in the form of a block that has the same block size as the removed block. In the above example, if block 5's offset in the virtual overflow disk 408 was an offset specified by the free list 602, the driver 404 may remove the offset being reused from the free list 602, and may add the offset to the offset index in record 5. In the above example, if block 5's offset in the virtual overflow disk 408 was a new offset derived from the offset index, the driver 404 may update record 5 by setting the pointer to the block 5's location in the virtual cache 406 to null (e.g., by releasing the memory pointed to by the pointer back to the guest operating system 330A, or reusing the memory to store an incoming chunks of data in the form of a block) and adding offset 3 to the offset index in record 5.

While some of the above features were described with respect to block 5 being transferred from the virtual cache 406 to the virtual overflow disk 408, other blocks may be transferred from the virtual cache 406 to the virtual overflow disk 408 in the same manner as discussed above.

At step 712, driver 404 may identify the non-overlapping range portions of the requested range (e.g., portions of the requested range that are not accounted for in the search tree 500). In some cases, one or more portions of the requested range might not be overlapped by any of the ranges associated with the nodes of search tree 500. Such portions may be referred to herein as non-overlapping range portions of the requested range. Following the above example, the non-overlapping portion of the requested range is from 24,000 to 24,999, from 26,001 to 26,499, and from 27,501 to 29,999.

At step 714, the driver 404 may, for the non-overlapping range portions of the requested range, adjust the range of one or more existing nodes and/or generate one or more new nodes for the search tree 500 to account for the non-overlapping range portions of the requested range, which may correspond to one or more portions of the chunks of data. Since each node corresponds to a different block and the block size is limited by the configurable maximum block size, the range of any node in the search tree 500 corresponds to the block size and is also limited by the block size. As an example, if the maximum block size is 2,000 bytes, then the range of any node in the search tree 500 cannot be larger than 2,000 bytes. In addition, because the minimum block size is the sector size, the range of any node in the search tree 500 may be at least equal to the sector size. As an example, if the sector size is 500 bytes, then the minimum range of a node in the search tree 500 is 500 bytes. In short, the range of any node in the search tree 500 may be greater than or equal to the sector size and less than or equal to the configurable maximum block size.

If one or more of the non-overlapping range portions of the requested range is continuous with a range of a node of the search tree 500, then the driver 500 may inspect the record corresponding to the node in the global linked list 600. If the node is associated with a block stored in the virtual cache 406, the driver 404 may act in accordance with one or more of the following two cases.

In a first case, a block size of the block stored in the virtual cache 406 may be less than the configurable maximum block size. In such a case, the driver 404 may determine to increase the block size of the block until it reaches the configurable maximum block size (e.g., by adding, to the block, a portion of the chunks of data having a range that is continuous with the range of the node in step 716). As an example, the non-overlapping range from 24,000 to 24,999 is continuous with node 2's range of 25,000 to 26,000. Because the block size (e.g., 1,000 bytes) of block 2 (which corresponds to node 2) is less than the configurable maximum block size (e.g., 2,000 bytes), then the driver 404 may determine to increase block 2 so that block is also associated with the non-overlapping range from 24,000 to 24,999. As a result, the range of node 2 may be increased so that the range is from 24,000 to 26,000. As will be discussed in step 716, the portion of the chunk of data having a range from 24,000 to 24,999 may be added to block 2.

In a second case, the block size of the block may already be equal to the configurable maximum block size. In such a case, the block might not be adjusted and the range of the corresponding node may be maintained. Since the chunks of data associated with the non-overlapping range cannot be added to the block, the driver 404 may determine whether it is continuous with another block and perform a similar analysis. If the chunks of data associated with the non-overlapping range cannot be added to any block, then the driver 404 may generate one or more new nodes in the search tree 500 to account for this portion of the chunks of data and its associated non-overlapping range portion.

If one or more of the non-overlapping range portions is dis-continuous from a range of node in the search tree 500, the driver 404 may generate one or more new nodes in the search tree 500 for the non-overlapping and discontinuous portions of the requested range.

In generating new nodes for the search tree 500, the driver 404 may account for the configurable maximum block size and the minimum sector size of a block. Because each new node will correspond with a new block written to the virtual cache 406, the range of any node in the search tree 500 corresponds to the block size and is also limited by the block size. Thus, the driver 404 may divide the portions of the requested range for which new nodes are being generated in the search tree 500 such that the range of each new node will have a range that corresponds to the maximum block size, if possible. For those portions of the requested range that cannot form a range that corresponds to the maximum block size, the driver 404 may form a node having a range that corresponds to a multiple of the sector size. In some cases, the range of a new node may correspond to the sector size.

At step 716, the driver 404 may write the write blocks to the virtual cache 406 and update the global linked list 600. As noted above, the driver 404 may append portions of the chunks of data to one more existing blocks stored in the virtual cache and/or may form one or more new blocks using the portions of the chunks of data.

In instances where the driver 404 increased the range of the node, which correlates to the size of a block already stored in the virtual cache 406, the driver 404 may identify the portion of the chunks of data having a continuous range with a node associated with the block. The driver 404 may allocate memory from the system non-paged pool and write the portion of the chunks of data to virtual cache 406 to increase the block's block size. Following the example of the first case, the portion of the chunks of data associated with range 24,000 to 24,999 may be added to block 2 in the virtual cache 406. The driver 404 may then update the record corresponding to block 2 in the global linked list 600. For example, record 2 may be updated to include the new block size of 2,000 bytes and the range of its associated node is from 24,000 to 26,000. The block may be set to Tx and the position indicator in the least recently used list for each of the other blocks in the virtual cache 406 may each be incremented by 1. In addition, in some instances, the pointer to the location of the block may be adjusted to account for the increased block size.

In instances where the driver 404 generated one or more new nodes, the driver 404 may form a block for each node using a respective portion of the chunks of data associated with the same range as the new node. The driver 404 may dynamically allocate memory from the system non-paged pool for use by the virtual cache 406. The blocks may then be written into newly allocated, available/unused space of the virtual cache 406. In some cases, the overflow condition might not have yet been satisfied. In such cases, the write blocks may be written in sequential order in the virtual cache 406 beginning at the next newly allocated available unused memory space. In other cases, the overflow condition may have been satisfied. In such cases, blocks were previously transferred from the virtual cache 406 to the virtual overflow disk 408 to make room for the write blocks. The driver 404 may write the write blocks in the newly freed space in the virtual cache 406.

Each new node may correspond to a different new block. The node and the block may be associated with the same range relative to the virtual system disk B 326B. The driver 404 may generate a record for the node in the global linked list 600 and may populate the record with appropriate information including a record ID, a node ID, a block ID, a range, a block size, and a pointer to location of block in virtual cache 406. In addition, the driver 404 may set offset to the block's location in the virtual overflow disk 408 to null, and update the least recently used list.

In some cases, a portion of the requested range may have the same range as a node in the search tree 500 that is associated with a block stored in the virtual cache 406. In such cases, the driver 404 may overwrite the data in that block with a portion of the chunks of data that corresponds to that portion of the requested range. The driver 404 may use the pointer to the block's location in the virtual cache 406 (which is stored in the global linked list) to identify where to write the portion of the chunks of data. In addition, the driver 404 may update the least recently used list.

In some cases, a portion of the requested range may have the same range as a node in the search tree 500 that is associated with a block stored in the virtual overflow disk 408. In such cases, the driver 404 may form a block using a portion of the chunks of data that corresponds to the portion of the requested range and write the block into the virtual cache 406 and the block stored in the virtual overflow disk 408 may be removed and/or added to the free list 602 for reuse by the driver 404. In addition, the record for the block may be updated to set a value to its pointer to the block's location in the virtual cache 406 and to set the offset value with respect to the virtual overflow disk 408 to null. Further, the driver 404 may update the least recently used list.

In one or more cases, the write command may be the first-in-time write command since the virtual session was created. In such cases, a search tree 500 has not yet been generated by the driver 404. Upon receiving the first-in-time write command, the driver 404 may dynamically generate the search tree 500, one or more nodes of the tree 500 to correspond to the requested range (or a portion thereof), and a global linked list 600.

Figure 8:
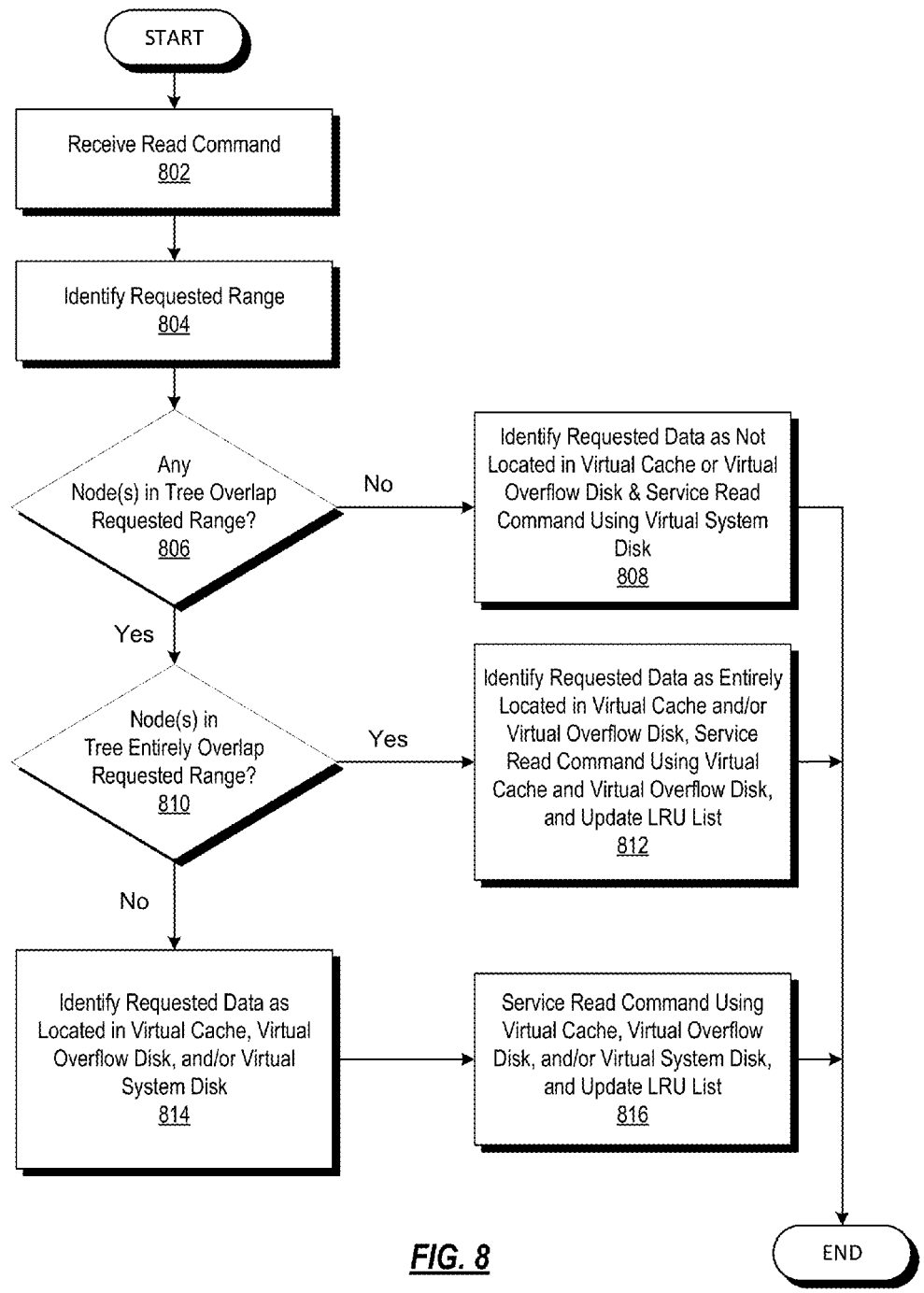
FIG. 8 depicts an illustrative flow for processing a read command and managing virtual memory, in accordance with one or more illustrative aspects discussed herein.

FIG. 8 depicts an illustrative flow of processing a read command and management of virtual memory, in accordance with one or more illustrative aspects discussed herein. In one or more embodiments, the steps of FIG. 8 and/or one or more steps thereof may be performed by driver 404, hypervisor 302, and/or another entity. In other embodiments, the method illustrated in FIG. 8 and/or one or more steps thereof may be embodied in computer-executable instructions that are stored in a computer-readable medium, such as a non-transitory computer-readable memory. In some instances, one or more of the steps of FIG. 8 may be performed in a different order. In some instances, one or more of the steps of FIG. 8 may be omitted and/or otherwise not performed. Prior to beginning the steps of FIG. 8, the session instance of the virtual machine B 332B may have already been initiated by hypervisor 302.

The method may begin at step 802 in which driver 404 may receive a read command from an IO request issuer (e.g., a virtual application, the guest OS, hypervisor 302, etc.) that wishes to read data from virtual memory, which may be referred to herein as requested data. The read command may include an offset relative to the virtual system disk B 326B and a length. Both the offset and the length may be specified in bytes. In some cases, the offset and the length may correspond to a file the in the virtual system disk B 332B.

At step 804, the driver 404 may identify a requested range associated with the read command in a similar manner as discussed above in connection with step 702. For instance, the driver 404 may identify the offset as the starting value of the range and the summation of the offset and length as the ending value of the range. As an example, if the offset is 25,000 bytes and the length is 10,000 bytes, then the range may begin at 25,000 and end at 35,000. As used herein, the range determined in step 804 may be referred to herein as the requested range.

At step 806, the driver 404 may traverse the search tree 410 and determine whether a range associated with any of the nodes of the search tree 410 (e.g., search tree 500) at least partially overlap the requested range. In one or more instances, the search tree 500 might not have any nodes with a corresponding range that overlaps at least a portion of the requested range. As an example, the requested range may be 46,000 bytes to 55,000 bytes. In such an example, the requested range might not be partially overlapped by any of the ranges of the nodes of search tree 500. In such cases, driver 404 may determine that the requested range is not overlapped by any of the nodes in the tree 500 and proceed to step 808.

At step 808, the driver 404 may identify the data associated with the requested range as not being located in the virtual cache 406 or the virtual overflow disk 408 and, as a result, may service the read command using the virtual system disk B 326B. The nodes of the search tree 500 account for every write command to the virtual cache 406 (absent deletions from a trim message described in detail below). As a result, if none of the ranges for the nodes of the search tree 500 at least partially overlap the requested range, then the data corresponding to the requested range is not stored in the virtual cache 406 or the virtual overflow disk 408. In some cases, the data corresponding with the requested range might not be stored in the virtual cache 406 or the virtual overflow disk 408 because that data has not ever been written to the virtual cache 406. In other cases, the data corresponding with the requested range might not be stored in the virtual cache 406 or the virtual overflow disk 408 because although such data was once written to the virtual cache 406 (and stored in virtual cache 406 and possibly in the virtual overflow disk 408), a trim message may have caused such data to be removed from the virtual cache 406 or the virtual overflow disk 408, as will be discussed in further detail below.

Since the data associated with the requested range cannot be retrieved from the virtual cache 406 or virtual overflow disk 408, the driver 404 may retrieve the data from the virtual disk B 326b using the requested range. The driver 404 may locate the requested range in the virtual disk B 326B and read each of the read blocks in the requested range to obtain the data. The driver 404 may place the retrieved read blocks into virtual IO buffer 412 for use/retrieval by the IO request issuer or may directly send the retrieved read blocks to the IO request issuer thereby servicing the read command.

The blocks read from the virtual disk B326B may be placed in the virtual IO buffer 412 instead of being placed in the virtual cache 406. Consequently, servicing of the read command does not consume additional space of the virtual cache 406, which conserves the amount of used space in the virtual cache 406. In addition, the virtual cache 406 will fill more slowly since only write commands (and not read commands) will cause blocks to be added to the virtual cache 406. Thus, use of the virtual overflow disk 408 will occur at a later point in time since the virtual cache 406 takes longer to reach its overflow condition as compared to a typical virtual cache where a read command causes blocks retrieved from the system disk to be stored in the virtual cache to service the read command.

Because the read blocks are being retrieved from the virtual disk B 326B and are not being placed in the virtual cache 406 and/or the virtual overflow disk 408, the driver 404 might not update the global linked list 600 or the free list 602.

If, in step 806, the driver 404 determines that the range associated with at least one node of the search tree 500 at least partially overlaps the requested range, then the driver 404 may, in step 810, determine whether a combination of one or more of the ranges for the nodes of the search tree 500 entirely overlap the requested range. For instance, the driver 404 may traverse the search tree 500 and identify nodes having ranges that at least partially overlap the requested range. The driver 404 may determine whether the combination of ranges of these identified nodes completely and/or otherwise entirely overlap the requested range. As an example, the requested range may be from 31,000 to 34,000. In this example, the combination of the range of node 1 and the range of node 3 entirely overlap the requested range. Nodes 2, 4, and 5 might not have ranges that overlap the requested range and node 1 may only partially overlap the requested range. However, because the combined ranges of nodes 1 and 3 entirely overlap the requested range, the driver 404 may proceed to step 812.

At step 812, the driver 404 may identify the data associated with the requested range as being entirely located in the virtual cache 406 and/or the virtual overflow disk 408, service the read command using the virtual cache 406 and/or the virtual overflow disk 408, and update the least recently used list in the global linked list 600. Since the requested range is entirely accounted for in the virtual cache 406 and/or the virtual overflow disk 408, the driver 404 might not retrieve blocks associated with the requested range from the virtual disk B 326B. Instead, the driver 404 may read the blocks associated with the requested range from the virtual cache 406 and/or the virtual overflow disk 408 to service the read request. For instance, the driver 404 may use the search tree 500 to identify the records in the global linked list 600 that correspond to the overlapping nodes. The driver 404 may use the records to identify pointers for the blocks associated with the requested range that are stored in the virtual cache 406. The driver 404 may use the pointers to obtain the blocks associated with the requested range from the virtual cache 406. In addition, the driver 404 may use the offset index to identify offsets at which other blocks associated with the requested range are stored in the virtual overflow disk 408 to obtain the other blocks from the virtual overflow disk 408. In some cases, a copy of the read blocks may be placed in the virtual IO buffer 412 and sent to the read command issuer. In addition, each block read from the virtual cache 406 and/or the virtual overflow disk 408 may be moved to the head of the least recently used list.

If, in step 810, the driver 404 determines that there is not a combination of one or more of the ranges for nodes of the search tree 500 that entirely overlaps the requested range, the method may proceed to step 814. In such a case, the ranges for the nodes of the tree 500 only partially overlap the requested range. As an example, the requested range may be from 28,000 to 31,000. As a result, the portion of the requested range from 28,000 to 29,999 might not be overlapped by a range of any node in the search tree 500. Additionally, the portion of the requested range from 30,000 to 31,000 may be overlapped by the range associated with node 1.

At step 814, the driver 404 may identify at least a portion of the requested data associated with the requested range as being located in the virtual cache 406 and/or the virtual overflow disk 408, and at least a different portion of the requested data associated with the requested range as being located in the virtual disk B 326B and not located in the virtual cache 406 or the virtual overflow disk 408.

At step 816, the driver 404 may service the read command using (a) at least one or more of the virtual cache 406 and/or the virtual overflow disk 408 and (b) the virtual disk B 326B. The driver 404 may also update the least recently used list in the global linked list 600.

For a portion of the requested range overlapped by the ranges of the nodes of the search tree 500 (referred to herein as an overlapping portion), the process may continue in a manner similar to step 812. Since the overlapping portion of the requested range is entirely accounted for in the virtual cache 406 and/or the virtual overflow disk 408, the driver 404 might not retrieve blocks associated with the overlapping portion of the requested range from the virtual disk B 326B. Instead, the driver 404 may read the blocks associated with the overlapping portion of the requested range from the virtual cache 406 and/or the virtual overflow disk 408 and place the blocks in the virtual IO buffer 412. For instance, the driver 404 may identify the records in the global linked list 600 that correspond to the overlapping nodes. The driver 404 may use the records to identify pointers for the blocks associated with the requested range that are stored in the virtual cache 406. The driver 404 may use the pointers to obtain the blocks associated with the requested range from the virtual cache 406. In addition, the driver 404 may use the offset index to identify offsets at which other blocks associated with the requested range are stored in the virtual overflow disk 408 to obtain the other blocks from the virtual overflow disk 408. In some cases, a copy of the read blocks may be placed in the virtual IO buffer 412. In addition, each block read from the virtual cache 406 and/or the virtual overflow disk 408 may be moved to the head of the least recently used list.

For a portion of the requested range that is not overlapped by a range of any of the nodes of the search tree 500 (referred to herein as a non-overlapping portion), the process may continue in a manner similar to step 808. Since the non-overlapping portion of the requested data cannot be retrieved from the virtual cache 406 or virtual overflow disk 408, the driver 404 may retrieve the data from the virtual disk B 326B using the non-overlapping portion of the requested range. The driver 404 may locate the non-overlapping portion of the requested range in the virtual disk B 326B and read each of the read blocks in the non-overlapping portion of the requested range to obtain the data. The driver 404 may place the retrieved read blocks into virtual IO buffer 412.

In some cases, the driver 404 may place the read blocks retrieved from the virtual system disk B 326B into the virtual IO buffer 412 prior to placing the read blocks retrieved from the virtual cache 406 and/or the virtual overflow disk 408 into the virtual IO buffer 412. The driver 404 may identify any overlap of read blocks retrieved from the virtual cache 406 and/or the virtual overflow disk 408 and the read blocks retrieved from the virtual system disk B 326B. The driver 404 may overwrite the read blocks retrieved from the virtual system disk B 326B with those overlapping read blocks retrieved from the virtual cache 406 and/or the virtual overflow disk 408. As a result, the driver 404 may only have to perform a single read from the virtual system disk B 326B.

Each of the blocks read from one of the virtual cache 406, the virtual overflow disk 408, or the virtual disk B 326B stored in the virtual IO buffer 412 may be sent to the IO request issuer thereby servicing the read command.

The blocks associated with the non-overlapping portion of the requested range may be placed in the virtual IO buffer 412 instead of being placed in the virtual cache 406 and/or virtual overflow disk 408. Consequently, servicing the read command does not consume any additional space of the virtual cache 406, which conserves the amount of used space in the virtual cache 406. In addition, the virtual cache 406 will fill more slowly since only write commands (and not read commands) will cause blocks to be added to the virtual cache 406. Thus, use of the virtual overflow disk 408 will occur at a later point in time since the virtual cache 406 takes longer to reach its overflow condition as compared to a typical virtual cache were read blocks are stored in the virtual cache to service a read command.

Because the blocks associated with the non-overlapping portion of the requested range are being read from the virtual disk B 326B and are not being placed in the virtual cache 406 and/or the virtual overflow disk 408, the driver 404 might not update the global linked list 600 or the free list 602.

Figure 9:
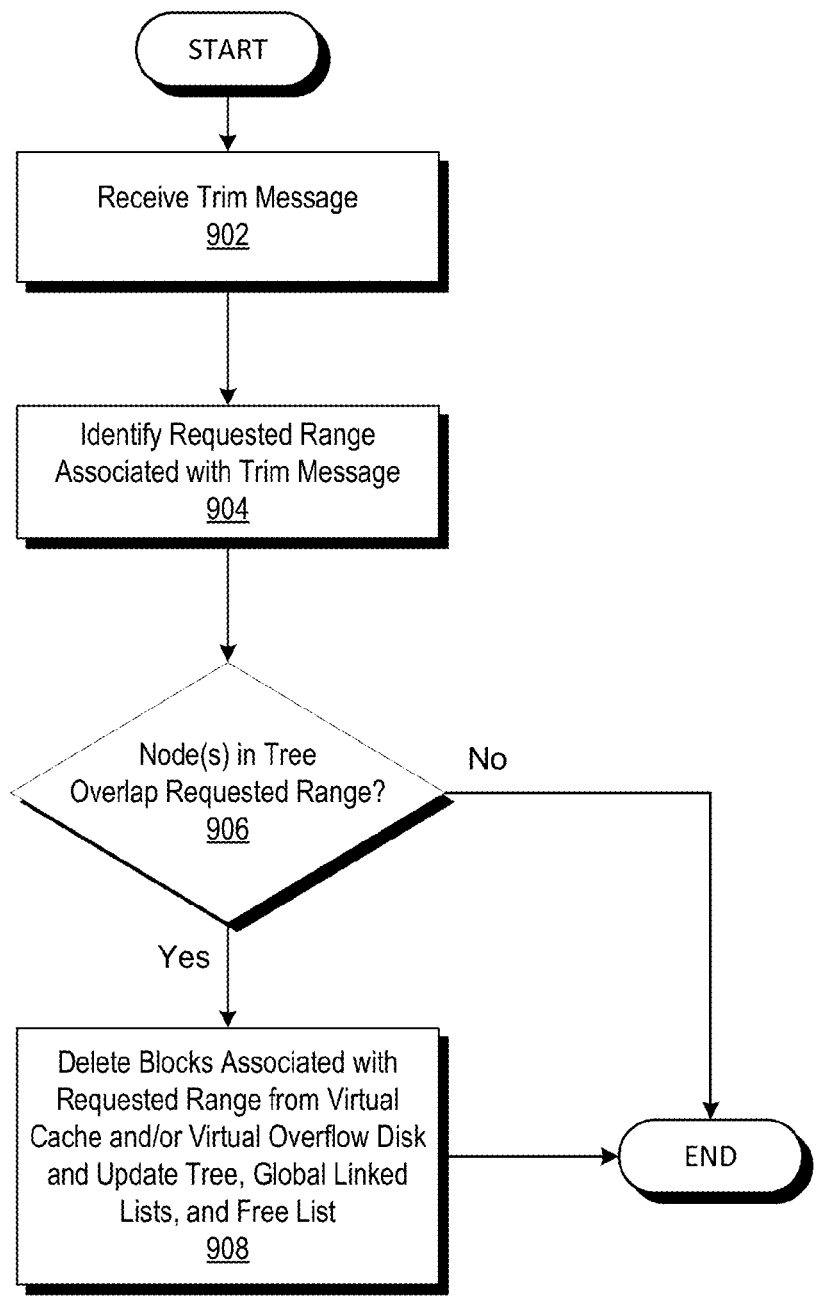
FIG. 9 depicts an illustrative flow for processing a trim command and managing virtual memory, in accordance with one or more illustrative aspects discussed herein.

FIG. 9 depicts an illustrative flow of processing a trim command and managing virtual memory, in accordance with one or more illustrative aspects discussed herein. In one or more embodiments, the steps of FIG. 9 and/or one or more steps thereof may be performed by driver 404, hypervisor 302, and/or another entity. In other embodiments, the method illustrated in FIG. 9 and/or one or more steps thereof may be embodied in computer-executable instructions that are stored in a computer-readable medium, such as a non-transitory computer-readable memory. In some instances, one or more of the steps of FIG. 9 may be performed in a different order. In some instances, one or more of the steps of FIG. 9 may be omitted and/or otherwise not performed. Prior to beginning the steps of FIG. 9, the session instance of the virtual machine B 332B may have already been initiated by hypervisor 302.

The method may begin at step 902 in which driver 404 may receive a trim message from an entity (e.g., an operating system, application, hypervisor 302, etc.). A trim message may be used to delete and/or otherwise remove blocks from the virtual cache 406 and/or the virtual overflow disk 408. The trim message may include an offset in the virtual disk B 326B and a length, which may be specified in bytes.

At step 904, the driver 404 may identify a requested range associated with the trim message based on the offset and the length included in the trim message. As an example, if the offset value is 26,500 bytes and the length is 500 bytes, then the requested range is from 26,500 to 27,000.

At step 906, the driver 404 may determine whether the ranges for any of the nodes in the search tree 500 at least partially overlap the requested range. If not, the process may end. Otherwise, if a range of at least one node at least partially overlaps the requested range, the process may continue to step 908.

At step 908, the driver 404 may delete blocks associated with the requested range stored in the virtual cache 406 and/or the virtual overflow disk 408, and update the tree 500, the global linked list 600, and the free list 602. For instance, the driver 404 may identify the records associated with the requested range using search tree 500. The driver 404 may use the records to locate and delete blocks associated with the requested range in the virtual cache 406 and/or the virtual overflow disk 408. For instance, if a block is located in the virtual cache 406, the driver 404 may use a pointer to the block's location in the virtual cache 406 to delete the block. For instance, if a block is located in the virtual overflow disk 408, the driver 404 may use an offset to the block's location in the virtual overflow disk 408 to delete the block. In addition, the driver 406 may update the global linked list 600 by removing the records of deleted blocks from the global linked list 600.

Further, for any blocks removed from the virtual overflow disk 408, the offsets at which those blocks were stored in the virtual overflow disk 408 and their block size (e.g., available space) may be added to the free list 602 for subsequent reuse by the driver 404 to store other overflowed blocks from the virtual cache 406.

In one or more arrangements, the blocks stored in the virtual overflow disk 408 may be associated with a least recently used list, which may be part of the global linked list 600 but maintained separately from the least recently used list for the blocks stored in the virtual cache 406. In such arrangements, the driver 404 may transfer one of more of the remaining most recently used blocks from the virtual overflow cache 408 and store those blocks in the newly available space in the virtual cache 406. The driver 404 may update the records of the global linked list 600 for those blocks. For instance, a transferred block's offset value may be set to null and its pointer may be set to the location in the virtual cache 406 where it has been stored. In addition, the transferred blocks may be identified as the least recently used blocks in the least recently used list for the blocks stored in the virtual cache 406.

The driver 404 may also update the search tree 500 by deleting nodes of blocks that have been deleted from the virtual cache 406 or the virtual overflow disk 408, and re-balancing and/or otherwise adjusting the search tree 500 as necessary. For instance, one or more nodes of the search tree 500 may be split into two nodes. One or more nodes of the search tree 500 may be merged. Once the nodes have been adjusted, the driver 404 may rebalance the tree 500 if the heights of two sub-trees differ by more than a preset threshold as discussed above. Further, the driver 404 may update the global linked list 600 to reflect any changes made to the tree 500.

While the above aspects were described with respect virtual memory, similar methodologies can be applied to physical memory. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. An apparatus comprising:
   a processor; and
   a non-transitory computer-readable medium storing one or more instructions that, when executed by the processor, causes the apparatus to:
      generate a virtual session comprising a virtual driver, a virtual cache, a virtual overflow disk, and a virtual system disk;
      receive, by the virtual driver from an input/output request issuer, a write command comprising an offset and a length, the offset being relative to the virtual system disk;
      calculate, by the virtual driver, a requested range based on the offset and the length;
      in response to determining that an overflow condition for the virtual cache has been satisfied,
         transfer one or more blocks from the virtual cache to the virtual overflow disk;
      determine whether any of a plurality of nodes of a tree have a range that at least partially overlaps the requested range; and
      in response to determining that none of the plurality of nodes have a range that at least partially overlaps the requested range, generate a new node for the tree having a range that at least overlaps a portion of the requested range.

2. The apparatus of claim 1, wherein the non-transitory computer-readable medium stores one or more additional instructions that, when executed by the processor, causes the apparatus to:
   write, to the virtual cache, a block associated with the portion of the requested range; and
   generate a record in a global linked list for the new node, the record comprising a pointer to a location of the block in the virtual cache.

3. The apparatus of claim 1, wherein the non-transitory computer-readable medium stores one or more additional instructions that, when executed by the processor, causes the apparatus to:
   in response to determining that a node of the tree overlaps the requested range,
      retrieve a record corresponding to the node from a global linked list;
      obtain a pointer to a location in the virtual cache from the record; and
      write, to the location in the virtual cache, a block associated with the portion of the requested range that is overlapped by the range of the node.

4. The apparatus of claim 1, wherein the non-transitory computer-readable medium stores one or more additional instructions that, when executed by the processor, causes the apparatus to:
   update an offset index associated with the virtual overflow disk for the transferred one or more blocks, the offset index comprising one or more offsets at which the transferred one or more blocks are stored in the virtual overflow disk, respectively.

5. The apparatus of claim 1, wherein the non-transitory computer-readable medium stores one or more additional instructions that, when executed by the processor, causes the apparatus to:
   select the one or more blocks for transfer from the virtual cache to the virtual overflow disk based on the one or more blocks being least recently used with respect to blocks stored in the virtual cache.

6. The apparatus of claim 1, wherein the non-transitory computer-readable medium stores one or more additional instructions that, when executed by the processor, causes the apparatus to:
   receive, by the virtual driver from the input/output request issuer, a read command comprising an offset and a length;
   calculate, by the virtual driver, a different requested range based on the offset and the length included in the read command; and
   determine whether any of the plurality of nodes of the tree have a range that at least partially overlaps the different requested range.

7. The apparatus of claim 6, wherein the non-transitory computer-readable medium stores one or more additional instructions that, when executed by the processor, causes the apparatus to:
   in response to determining that none of the plurality of nodes of the tree have a range that at least partially overlaps the different requested range, retrieve blocks associated with the different requested range from the virtual system disk and place the retrieved blocks in an input/output buffer different from the virtual cache and the virtual overflow disk.

8. The apparatus of claim 6, wherein the non-transitory computer-readable medium stores one or more additional instructions that, when executed by the processor, causes the apparatus to:
   in response to determining that one or more of the plurality of nodes of the tree have a range that entirely overlaps the different requested range, retrieve blocks associated with the different requested range from the virtual cache or the virtual overflow disk.

9. The apparatus of claim 6, wherein the non-transitory computer-readable medium stores one or more additional instructions that, when executed by the processor, causes the apparatus to:
  in response to determining that the plurality of nodes of the tree have a collective range that only partially overlaps the different requested range, retrieve a first set of blocks associated with the different requested range from the virtual cache or the virtual overflow disk and retrieve a second set of blocks associated with the different requested range from the virtual system disk.

10. The apparatus of claim 1, wherein the non-transitory computer-readable medium stores one or more additional instructions that, when executed by the processor, causes the apparatus to:
  receive a trim message comprising an offset and a range;
  calculate an identified range based on the offset and the range included in the trim message;
  determine whether any of the plurality of nodes have a range that at least partially overlaps the identified range;
  in response to determining that a node of the plurality of nodes has a range that overlaps the identified range,
    determine a location of a block associated with the node in the virtual cache or the virtual overflow disk using the global linked list;
    delete the block from the virtual cache or the virtual overflow disk; and
    delete the node from the tree and a record corresponding to the node from the global linked list.

11. A system comprising:
  a computing device providing a virtual session for another computing device, the virtual session comprising:
    a virtual cache;
    a virtual overflow disk;
    a virtual system disk;
    a tree comprising a plurality of nodes, each node having a different range and being associated with a different record in a global linked list, wherein each record comprises a pointer to a location of a block stored in the virtual cache or an offset to a location of a block stored in the virtual overflow disk; and
    a virtual driver configured to:
      in response to receiving a write command,
        determine whether at least one node of the tree has a range that at least partially overlaps a first requested range associated with the write command; and
        in response to determining that none of the plurality of nodes of the tree have a range that at least partially overlaps the first requested range, generate a node for the tree that has at least a portion of the first requested range, and a corresponding record in the global linked list, wherein the record comprises a pointer to a location of a block associated with the node in the virtual cache; and
      in response to receiving a read command, determine whether one or more nodes of the tree have a range that at least partially overlaps a second requested range associated with the read command.

12. The system of claim 11, wherein the virtual session further comprises an input/output buffer different from the virtual cache and the virtual overflow disk, wherein the virtual driver is further configured to:
  in response to determining that none of the plurality of nodes of the tree have a range that at least partially overlaps the second requested range, retrieve blocks associated with the second requested range from the virtual system disk and place the retrieved blocks in the input/output buffer.

13. The system of claim 11, wherein the virtual driver is further configured to:
  in response to determining that one or more of the plurality of nodes of the tree have a range that entirely overlaps the second requested range, retrieve blocks associated with the second requested range from the virtual cache or the virtual overflow disk.

14. The system of claim 11, wherein the virtual driver is further configured to:
  in response to determining that the plurality of nodes of the tree have a collective range that only partially overlaps the second requested range, retrieve a first set of blocks associated with a first portion of the second requested range from the virtual cache or the virtual overflow disk and retrieve a second set of blocks associated with a second portion of the second requested range from the virtual system disk.

15. The system of claim 11, wherein the virtual driver is configured to prevent blocks associated with the read command and retrieved from the virtual system disk from being stored in the virtual cache.

16. A method comprising:
  generating, by a computing device, a virtual session comprising a virtual driver, a virtual cache, a virtual overflow disk, and a virtual system disk;
  receiving, by the virtual driver from an input/output request issuer, a write command comprising an offset and a length, the offset being relative to the virtual system disk;
  calculating, by the virtual driver, a first requested range based on the offset and the length;
  in response to determining that an overflow condition for the virtual cache has been satisfied,
    transferring one or more blocks from the virtual cache to the virtual overflow disk;
    determining whether any of a plurality of nodes of a tree have a range that at least partially overlaps the first requested range; and
    in response to determining that none of the plurality of nodes have a range that at least partially overlaps the first requested range, generating a new node for the tree having a range that overlaps at least a portion of the first requested range.

17. The method of claim 16, further comprising:
  receiving, by the virtual driver from the input/output request issuer, a read command comprising an offset and a length;
  calculating, by the virtual driver, a second requested range based on the offset and the length included in the read command; and
  determining whether any of the plurality of nodes of the tree have a range that at least partially overlaps the second requested range.

18. The method of claim 17, further comprising:
  in response to determining that none of the plurality of nodes of the tree have a range that at least partially overlaps the second requested range, retrieving blocks associated with the second requested range from the virtual system disk and placing the retrieved blocks in an input/output buffer different from the virtual cache and the virtual overflow disk.

19. The method of claim 17, further comprising:
in response to determining that one or more of the plurality of nodes of the tree have a range that entirely overlaps the second requested range, retrieving blocks associated with the second requested range from the virtual cache or the virtual overflow disk.

20. The method of claim 17, further comprising:
in response to determining that the plurality of nodes of the tree have a collective range that only partially overlaps the second requested range, retrieving a first set of blocks associated with a first portion of the second requested range from the virtual cache or the virtual overflow disk and retrieving a second set of blocks associated with a second portion of the second requested range from the virtual system disk.

* * * * *